(12) United States Patent
Holdcroft et al.

(10) Patent No.: US 10,005,886 B2
(45) Date of Patent: Jun. 26, 2018

(54) HYDROXIDE-STABLE IONENES

(71) Applicant: Simon Fraser University, Burnaby (CA)

(72) Inventors: Steven Holdcroft, Pitt Meadows (CA); Andrew Wright, Burnaby (CA)

(73) Assignee: Simon Fraser University, Burnaby (CA)

( * ) Notice: Subject to any disclaimer, the term of this patent is extended or adjusted under 35 U.S.C. 154(b) by 0 days. days.

(21) Appl. No.: 15/304,464

(22) PCT Filed: Apr. 15, 2015

(86) PCT No.: PCT/CA2015/000248
§ 371 (c)(1),
(2) Date: Oct. 14, 2016

(87) PCT Pub. No.: WO2015/157848
PCT Pub. Date: Oct. 22, 2015

(65) Prior Publication Data
US 2017/0037188 A1 Feb. 9, 2017

Related U.S. Application Data

(60) Provisional application No. 61/979,989, filed on Apr. 15, 2014.

(51) Int. Cl.
*C08G 73/18* (2006.01)
*H01M 4/86* (2006.01)
(Continued)

(52) U.S. Cl.
CPC .............. *C08G 73/18* (2013.01); *B01J 41/13* (2017.01); *C08J 5/2256* (2013.01); *C25B 13/08* (2013.01); *H01M 4/8668* (2013.01); *H01M 8/103* (2013.01); *C08J 2379/04* (2013.01); *H01M 2008/1095* (2013.01)

(58) Field of Classification Search
CPC ...... C08J 73/18; C08J 5/2256; C08J 2379/04; H01M 4/8668; H01M 8/103; H01M 2008/1095; B01J 41/125; C25B 13/08
(Continued)

(56) References Cited

FOREIGN PATENT DOCUMENTS

WO 2013/149328 A1 10/2013
WO WO 2013149328 A1 * 10/2013 ............. C08G 73/18

OTHER PUBLICATIONS

H. Pu et al. "Synthesis and Characterization of Fluorine-Containing Polybenzlmldazole for Proton Conducting Membranes in Fuel Cells", J.Polym. Science, Part A. Polymer Chemistry, 2010, vol. 48, No. 10, pp. 2115-2122.*

(Continued)

*Primary Examiner* — Michael M Bernshteyn
(74) *Attorney, Agent, or Firm* — Christensen O'Connor Johnson Kindness PLLC

(57) ABSTRACT

Described herein are stable hydroxide ion-exchange polymers. The polymers include ionenes, which are polymers that contain ionic amines in the backbone. The polymers are alcohol-soluble and water-insoluble. The polymers have a water uptake and an ionic conductivity that are correlated to a degree of N-substitution. Methods of forming the polymers and membranes including the polymers are also provided. The polymers are suitable, for example, for use as ionomers in catalyst layers for fuel cells and electrolyzers.

25 Claims, 6 Drawing Sheets

(51) Int. Cl.
- C08J 5/22 (2006.01)
- C25B 13/08 (2006.01)
- H01M 8/10 (2016.01)
- B01J 41/13 (2017.01)
- H01M 8/103 (2016.01)
- H01M 8/1018 (2016.01)

(58) Field of Classification Search
USPC .................................................. 521/27
See application file for complete search history.

(56) References Cited

OTHER PUBLICATIONS

H. Pu et al. "Synthesis and Characterization of Fluorine-Containing Polybenzimidazole for Proton Conducting Membranes in Fuel Cells", J. Polymer. Science, Part A. Polymer Chemistry, 2010, vol. 48, No. 10, pp. 2115-2122.*

Wright and Holdcroft "Hydroxide-Stable Ionenes", ACS Macro Letters, 2014, 3 (5), pp. 444-447.*

International Search Report and Written Opinion dated Jul. 8, 2015, issued in corresponding International Application No. PCT/CA2015/000248, filed Apr. 15, 2015, 8 pages.

Pu, H., et al., "Synthesis and Characterization of Fluorine-Containing Polybenzimidazole for Proton Conducting Membranes in Fuel Cells," Journal of Polymer Science: Part A: Polymer Chemistry 48:2115-2122, 2010.

European Patent Application No. 15780051.7, "Supplementary European Search Report", dated Sep. 6, 2017, 5 pages.

Wright et al., "Hydroxide-Stable Ionenes", ACS Macro Letters, vol. 3, No. 5, May 20, 2014, pp. 444-447.

* cited by examiner

HYDROXIDE-STABLE IONENES

CROSS-REFERENCE TO RELATED APPLICATION

This application claims the benefit of U.S. Provisional Application No. 61/979,989, filed Apr. 15, 2014, the disclosure of which is incorporated herein by reference in its entirety.

BACKGROUND

Alkaline anion exchange membrane (AAEM) fuel cells have received considerable interest as a high efficiency, low emission, and low cost energy converter. The use of non-precious metal catalysts in AAEM fuel cells provides a potential advantage over incumbent proton exchange membrane fuel cells. AAEMs may also find use in water electrolyzers for energy storage. Typical cationic functional groups for AAEMs include ammonium, sulfonium, phosphonium, pyridinium, imidazolium, benzimidazolium, and metal-cations, such as ruthenium. However, these generally degrade when exposed to solutions of high pH and at elevated temperature. Recently, an exceptionally hydroxide-stable polymer, mes-PDMBI-OH$^-$, having the structure

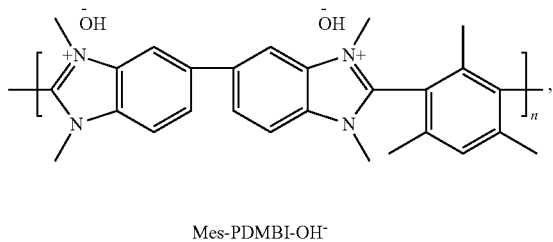

Mes-PDMBI-OH$^-$ was found to show no observable degradation in 6M KOH at room temperature or in 2M KOH at 60° C. Hydroxide-stability is conferred by introducing steric crowding around the C2-position of the benzimidazolium units. Mes-PDMBI-OH$^-$, however, is water-soluble, requiring it to be blended to form water-insoluble membranes. Blending reduces the ion-exchange capacity (IEC) from 4.5 meq g$^{-1}$ to 1-2 meq g$^{-1}$, which limits the conductivity. Moreover, blends require the use of a high-boiling solvent, DMSO, for casting, which greatly limits processability, especially for catalyst layer fabrication.

Selective solubility of hydroxide-conducting polymers has previously proven elusive. Of the few ammonium-based ionomers developed, most are soluble in solvents such as NMP and DMSO, requiring higher temperatures for spray-coating and are more likely to contaminate the catalyst layer. For example, an ammonium-based poly(2,6-dimethyl-phenylene oxide) was described in Li et al., J. Am. Chem. Soc., 2013, 135, 10124-10133 to have solubility in methanol and ethanol solvents; but it appears to degrade to 90% of its original conductivity after 60 h in a fuel cell and the stability in its dissolved state was not described.

Thus, polymers which contain cationic groups in the backbone that are stable and soluble in polar solvents (e.g., alcohols) but insoluble in water are needed. The polymers can be suitable for ionomers in catalyst layers for fuel cells and electrolyzers. The present disclosure seeks to fulfill these needs and provides further advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a polymer including one or more repeating units, wherein at least one of the repeating units includes one or more benzimidazolium-containing moieties of Formulas (I)-(V):

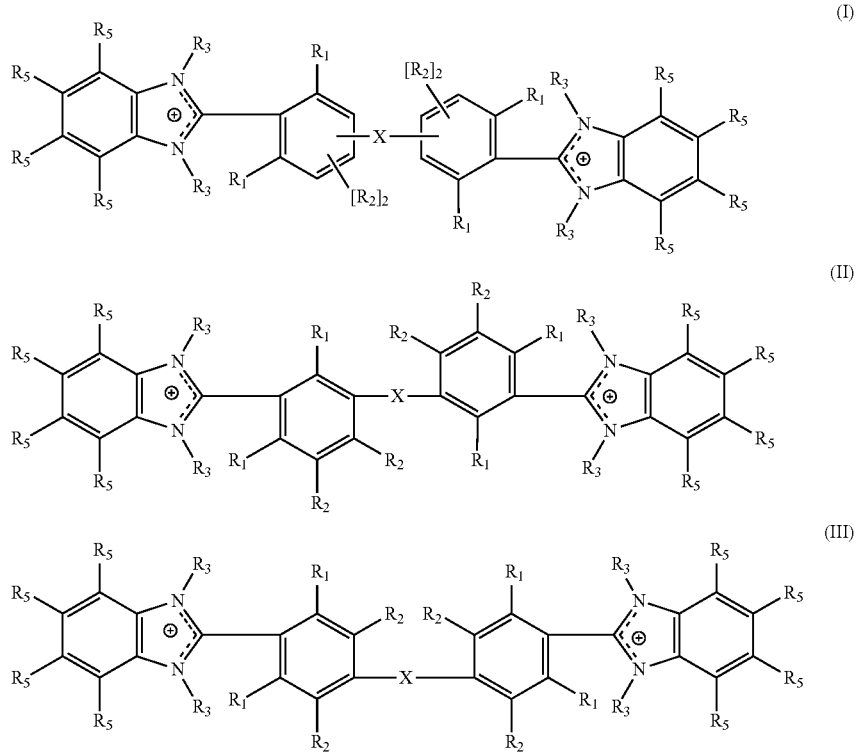

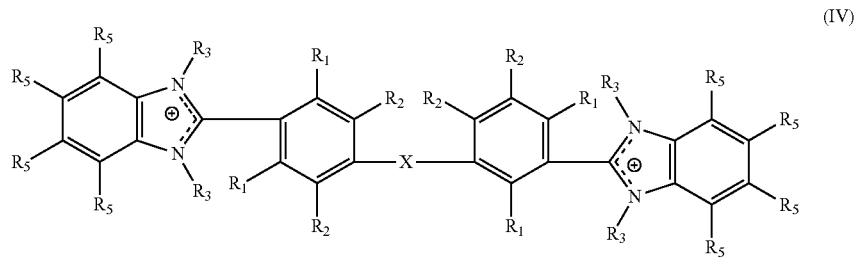

(IV)

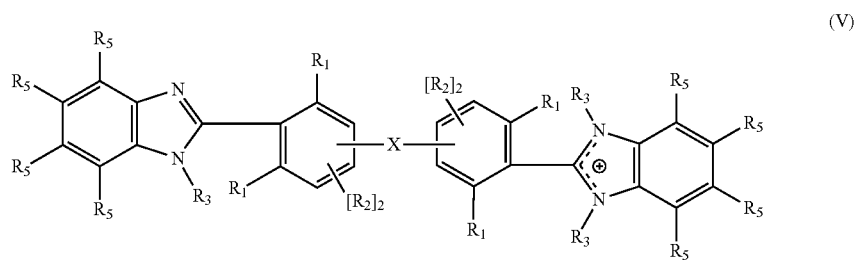

(V)

wherein:

R₁ is independently selected from the group consisting of methyl, trifluoromethyl, alkyl, perfluoroalkyl, heteroalkyl, alkoxy, perfluoroalkoxy, halo, aryl, heteroaryl group and a polymer;

R₂ is independently selected from the group consisting of hydrogen, any group, and a polymer;

R₃ is independently selected from the group consisting of methyl, trifluoromethyl, alkyl, perfluoroalkyl, heteroalkyl, aryl, aralkyl, and a polymer;

R₅ is independently selected from the group consisting of hydrogen, any group, and a polymer;

wherein at least one of R₁, R₂, R₃, and R₅, is a polymer; and

X is independently selected from the group consisting of alkylene, perfluoroalkylene, heteroalkylene, arylene, aralkylene, and no group.

In another aspect, the present disclosure features a polymer of Formula (VIII):

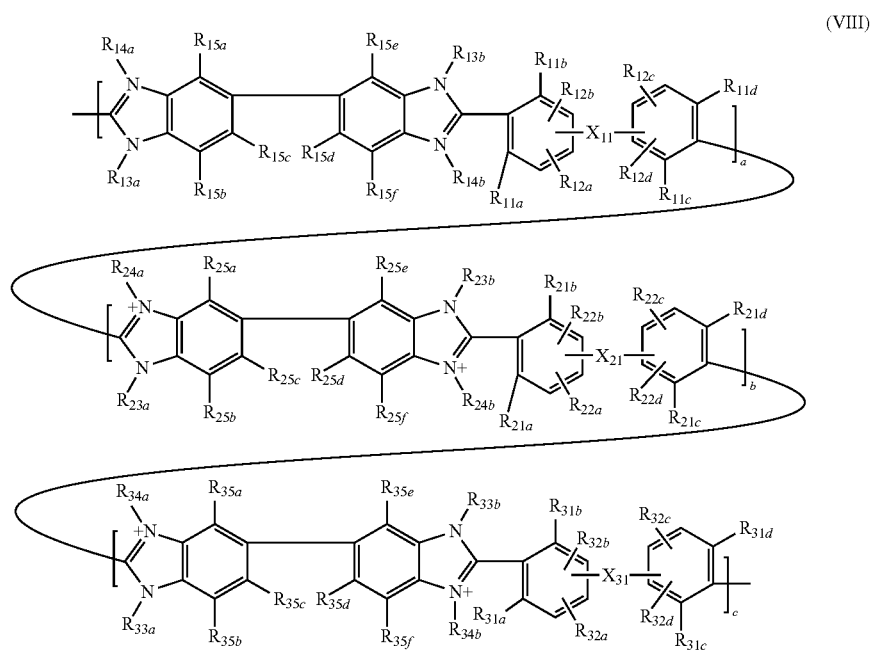

(VIII)

wherein:

$R_{11a}$, $R_{11b}$, $R_{11c}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each haloalkoxy, halo, aryl, and heteroaryl;

$R_{13a}$, $R_{13b}$, $R_{14a}$, and $R_{14b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that two of $R_{13a}$, $R_{13b}$, $R_{4a}$, and $R_{14b}$ are absent, and the remaining two are present and independently selected from $C_{1-6}$ alkyl, $C_{1-6}$ haloalkyl, $C_{1-6}$ alkoxy, $C_{1-6}$ haloalkoxy, halo, aryl, and heteroaryl.

$R_{23a}$, $R_{23b}$, $R_{24a}$, and $R_{24b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that one of $R_{23a}$, $R_{23b}$, $R_{24a}$ and $R_{24b}$ is absent, and the remaining three are present and independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{33a}$, $R_{33b}$, $R_{34a}$, and $R_{34b}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$X_{11}$, $X_{21}$, and $X_{31}$ are each independently selected from the group consisting of absent, $C_{1-6}$ alkylene, $C_{1-6}$ haloalkylene, arylene, and heteroarylene; and a, b, and c are mole percentages, wherein
a is from 0 mole percent to 45 mole percent,
b+c is 55 mole percent to 100 mole percent,
b and c are each more than 0 percent, and
a+b+c=100%.

In yet another aspect, the present disclosure features a polymer having Formula (VIIIa)

wherein:

$R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{12a}$, $R_{12c}$, $R_{22a}$, $R_{22c}$, $R_{32a}$, and $R_{32c}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$R_{13a}$, $R_{13b}$, $R_{14a}$, and $R_{14b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that two of $R_{13a}$, $R_{13b}$, $R_{14a}$, and $R_{14b}$ are absent, and the remaining two are present and independently selected from $C_{1-6}$ alkyl, $C_{1-6}$ haloalkyl, $C_{1-6}$ alkoxy, $C_{1-6}$ haloalkoxy, halo, aryl, and heteroaryl.

$R_{23a}$, $R_{23b}$, $R_{24a}$, and $R_{24b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that one of $R_{23a}$, $R_{23b}$, $R_{24a}$ and $R_{24b}$ is absent, and the remaining three are present and independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{33a}$, $R_{33b}$, $R_{34a}$, and $R_{34b}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$X_{11}$, $X_{21}$, and $X_{31}$ are each independently selected from the group consisting of absent, $C_{1-6}$ alkylene, $C_{1-6}$ haloalkylene, arylene, and heteroarylene; and a, b, and c are mole percentages, wherein
a is from 0 mole percent to 45 mole percent,
b+c is 55 mole percent to 100 mole percent,
b and c are each more than 0 percent, and
a+b+c=100%.

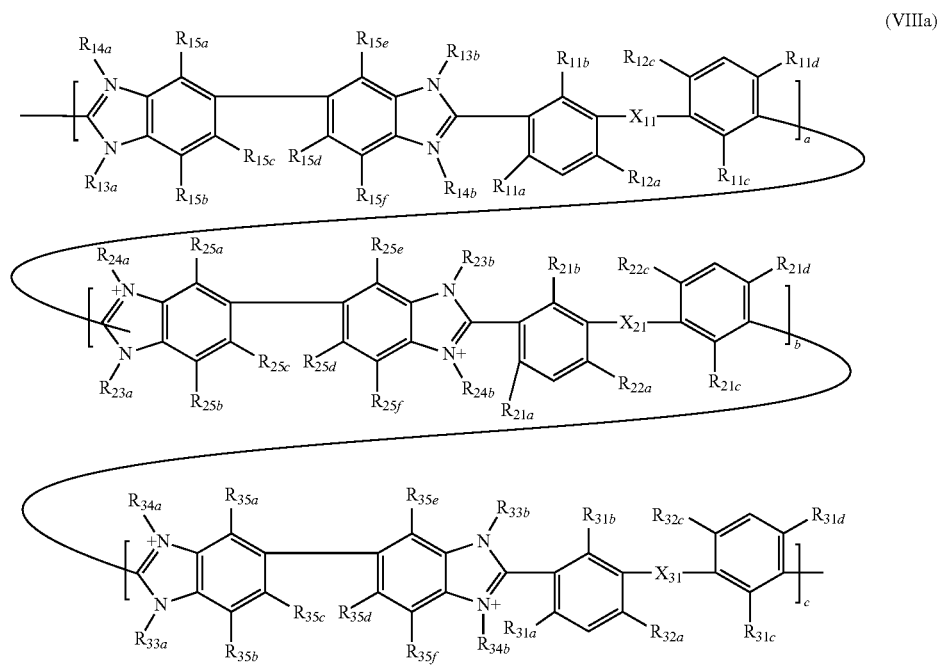
(VIIIa)

In yet another aspect, the present disclosure features an ionic membrane including any of the cationic polymers above.

In yet another aspect, the present disclosure features a method of post-functionalizing a polymer containing a benzimidazole moiety in a repeating unit to provide a neutral polymer containing a repeat unit of Formula VI, including the steps of:
  (a) deprotonating the polymer containing the benimidazole moiety with an alkali hydroxide by heating in a polar aprotic solvent and optionally an amount of water to provide a deprotonated benzimidazole-containing polymer;
  (b) optionally filtering and washing the deprotonated benzimidazole-containing polymer;
  (c) adding excess R—Y to the polymer solution and stirring to provide a neutral polymer containing a repeat unit of Formula VI, wherein R represents a methyl, trifluoromethyl, alkyl, perfluoroalkyl, heteroalkyl, aryl, or aralkyl group; and wherein Y represents an anionic leaving group comprising iodide, bromide, chloride, or sulfonate ester.

In yet a further aspect, the present disclosure features a method of post-functionalizing a neutral polymer containing a repeat unit of Formula (VI) to a cationic polymer containing a benzimidazole-containing moiety of Formulas (I), (V), and (VI), including the steps of:
  (a) dissolving a neutral polymer containing a repeat unit of Formula VI in an organic solvent to provide a polymer solution;
  (b) adding a known amount of R—Y to the polymer solution and stirring the polymer solution for a period of time to provide a cationic polymer containing Formulas (I), (V), and (VI).

Embodiments can include the following features.

In some embodiments, the polymer including one or more repeating units, wherein at least one of the repeating units includes one or more benzimidazolium-containing moieties of Formulas (I)-(V), further includes a second repeating unit defined by Formula (VI):

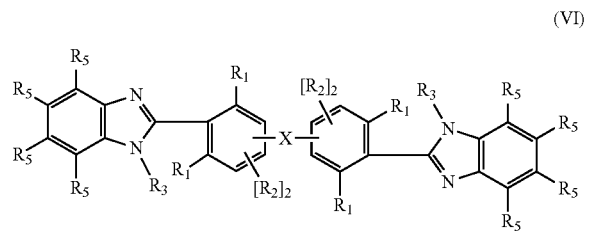

(VI)

wherein:
  $R_1$ is independently selected from the group consisting of methyl, trifluoromethyl, alkyl, perfluoroalkyl, heteroalkyl, alkoxy, perfluoroalkoxy, halo, aryl, heteroaryl group and a polymer;
  $R_2$ is independently selected from the group consisting of hydrogen, any group, and a polymer;
  $R_3$ is independently selected from the group consisting of methyl, trifluoromethyl, alkyl, perfluoroalkyl, heteroalkyl, aryl, aralkyl, and a polymer;
  $R_5$ is independently selected from the group consisting of hydrogen, any group, and a polymer;
  wherein at least one of $R_1$, $R_2$, $R_3$, and $R_5$, is a polymer; and X is independently selected from the group consisting of alkylene, perfluoroalkylene, heteroalkylene, arylene, aralkylene, and no group.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
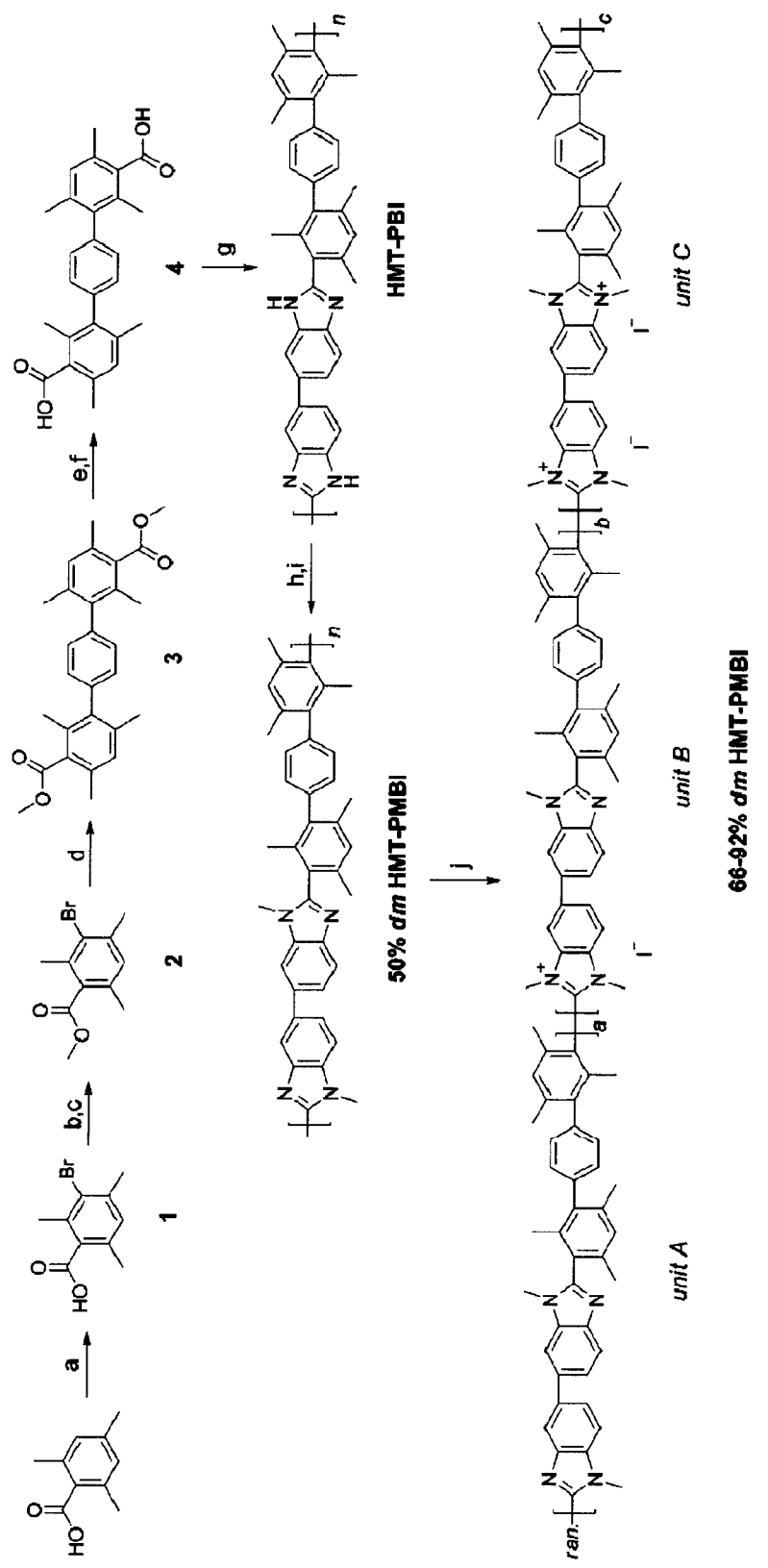
FIG. 1 is schematic illustration of a procedure for synthesizing an embodiment of a polymer of the present disclosure.

Described herein are stable hydroxide ion-exchange polymers. The polymers include ionenes, which are polymers that contain ionic amines in the backbone. The polymers are alcohol-soluble and water-insoluble. The polymers have a water uptake and an ionic conductivity that are correlated to a degree of N-substitution. Methods of forming the polymers and membranes including the polymers are also provided. The polymers are suitable, for example, for use as ionomers in catalyst layers for fuel cells and electrolyzers.

Definitions

At various places in the present specification, substituents of compounds of the disclosure are disclosed in groups or in ranges. It is specifically intended that the disclosure include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

It is further intended that the compounds of the disclosure are stable. As used herein "stable" refers to a compound that is sufficiently robust to survive isolation to a useful degree of purity from a reaction mixture.

It is further appreciated that certain features of the disclosure, which are, for clarity, described in the context of separate embodiments, can also be provided in combination in a single embodiment. Conversely, various features of the disclosure which are, for brevity, described in the context of a single embodiment, can also be provided separately or in any suitable subcombination.

"Optionally substituted" groups can refer to, for example, functional groups that may be substituted or unsubstituted by additional functional groups. For example, when a group is unsubstituted, it can be referred to as the group name, for example alkyl or aryl. When a group is substituted with additional functional groups, it may more generically be referred to as substituted alkyl or substituted aryl.

As used herein, the term "substituted" or "substitution" refers to the replacing of a hydrogen atom with a substituent other than H. For example, an "N-substituted piperidin-4-yl" refers to replacement of the H atom from the NH of the piperidinyl with a non-hydrogen substituent such as, for example, alkyl.

As used herein, the term "alkyl" refers to a straight or branched hydrocarbon groups having the indicated number of carbon atoms. Representative alkyl groups include methyl, ethyl, propyl (e.g., n-propyl, isopropyl), butyl (e.g., n-butyl, sec-butyl, and tert-butyl), pentyl (e.g., n-pentyl, tert-pentyl, neopentyl, isopentyl, pentan-2-yl, pentan-3-yl), and hexyl (e.g., n-pentyl and isomers) groups.

As used herein, the term "alkylene" refers to a linking alkyl group.

As used herein, the term "perfluoroalkyl" refers to straight or branched fluorocarbon chains. Representative alkyl groups include trifluoromethyl, pentafluoroethyl, etc.

As used herein, the term "perfluoroalkylene" refers to a linking perfluoroalkyl group.

As used herein, the term "heteroalkyl" refers to a straight or branched chain alkyl groups having the indicated number of carbon atoms and where one or more of the carbon atoms is replaced with a heteroatom selected from O, N, or S.

As used herein, the term "heteroalkylene" refers to a linking heteroalkyl group.

As used herein, the term "alkoxy" refers to an alkyl or cycloalkyl group as described herein bonded to an oxygen atom. Representative alkoxy groups include methoxy, ethoxy, propoxy, and isopropoxy groups.

As used herein, the term "perfluoroalkoxy" refers to a perfluoroalkyl or cyclic perfluoroalkyl group as described herein bonded to an oxygen atom. Representative perfluoroalkoxy groups include trifluoromethoxy, pentafluoroethoxy, etc.

As used herein, the term "aryl" refers to an aromatic hydrocarbon group having 6 to 10 carbon atoms. Representative aryl groups include phenyl groups. In some embodiments, the term "aryl" includes monocyclic or polycyclic (e.g., having 2, 3, or 4 fused rings) aromatic hydrocarbons such as, for example, phenyl, naphthyl, anthracenyl, phenanthrenyl, indanyl, and indenyl.

As used herein, the term "arylene" refers to a linking aryl group.

As used herein, the term "aralkyl" refers to an alkyl or cycloalkyl group as defined herein with an aryl group as defined herein substituted for one of the alkyl hydrogen atoms. A representative aralkyl group is a benzyl group.

As used herein, the term "aralkylene" refers to a linking aralkyl group.

As used herein, the term "heteroaryl" refers to a 5- to 10-membered aromatic monocyclic or bicyclic ring containing 1-4 heteroatoms selected from O, S, and N. Representative 5- or 6-membered aromatic monocyclic ring groups include pyridine, pyrimidine, pyridazine, furan, thiophene, thiazole, oxazole, and isooxazole. Representative 9- or 10-membered aromatic bicyclic ring groups include benzofuran, benzothiophene, indole, pyranopyrrole, benzopyran, quionoline, benzocyclohexyl, and naphthyridine.

As used herein, the term "heteroarylene" refers to a linking heteroaryl group.

As used herein, the term "halogen" or "halo" refers to fluoro, chloro, bromo, and iodo groups.

As used herein, the term "bulky group" refers to a group providing steric bulk by having a size at least as large as a methyl group.

As used herein, the term "copolymer" refers to a polymer that is the result of polymerization of two or more different monomers. The number and the nature of each constitutional unit can be separately controlled in a copolymer. The constitutional units can be disposed in a purely random, an alternating random, a regular alternating, a regular block, or a random block configuration unless expressly stated to be otherwise. A purely random configuration can, for example, be: x-x-y-z-x-y-y-z-y-z-z-z . . . or y-z-x-y-z-y-z-x-x . . . . An alternating random configuration can be: x-y-x-z-y-x-y-z-y-x-z . . . , and a regular alternating configuration can be: x-y-z-x-y-z-x-y-z . . . . A regular block configuration (i.e., a block copolymer) has the following general configuration: . . . x-x-x-y-y-y-z-z-z-x-x-x . . . , while a random block configuration has the general configuration: . . . x-x-x-z-z-x-x-y-y-y-z-z-z-x-x-z-z-z- . . . .

As used herein, the term "random copolymer" is a copolymer having an uncontrolled mixture of two or more constitutional units. The distribution of the constitutional units throughout a polymer backbone (or main chain) can be a statistical distribution, or approach a statistical distribution, of the constitutional units. In some embodiments, the distribution of one or more of the constitutional units is favored.

As used herein, the term "constitutional unit" of a polymer refers to an atom or group of atoms in a polymer, comprising a part of the chain together with its pendant atoms or groups of atoms, if any. The constitutional unit can refer to a repeat unit. The constitutional unit can also refer to an end group on a polymer chain. For example, the constitutional unit of polyethylene glycol can be —$CH_2CH_2O$— corresponding to a repeat unit, or —$CH_2CH_2OH$ corresponding to an end group.

As used herein, the term "repeat unit" corresponds to the smallest constitutional unit, the repetition of which constitutes a regular macromolecule (or oligomer molecule or block).

As used herein, the term "end group" refers to a constitutional unit with only one attachment to a polymer chain, located at the end of a polymer. For example, the end group can be derived from a monomer unit at the end of the polymer, once the monomer unit has been polymerized. As another example, the end group can be a part of a chain transfer agent or initiating agent that was used to synthesize the polymer.

As used herein, the term "terminus" of a polymer refers to a constitutional unit of the polymer that is positioned at the end of a polymer backbone.

As used herein, the term "cationic" refers to a moiety that is positively charged, or ionizable to a positively charged moiety under physiological conditions. Examples of cationic moieties include, for example, amino, ammonium, pyridinium, imino, sulfonium, quaternary phosphonium groups, etc.

As used herein, the term "anionic" refers to a functional group that is negatively charged, or ionizable to a negatively charged moiety under physiological conditions. Examples of anionic groups include carboxylate, sulfate, sulfonate, phosphate, etc.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Polymer Structure

This disclosure provides, inter alia, a polymer including one or more repeating units, wherein at least one of the repeating units includes one or more benzimidazolium-containing moieties of Formulas (I)-(V):

wherein:

$R_1$ is independently selected from the group consisting of methyl, trifluoromethyl, alkyl, perfluoroalkyl, heteroalkyl, alkoxy, perfluoroalkoxy, halo, aryl, heteroaryl group, and a polymer;

$R_2$ is independently selected from the group consisting of hydrogen, any group, and a polymer;

$R_3$ is independently selected from the group consisting of methyl, trifluoromethyl, alkyl, perfluoroalkyl, heteroalkyl, aryl, aralkyl, and a polymer;

$R_5$ is independently selected from the group consisting of hydrogen, any group, and a polymer;

wherein at least one of $R_1$, $R_2$, $R_3$, and $R_5$, is a polymer; and

X is independently selected from the group consisting of alkylene, perfluoroalkylene, heteroalkylene, arylene, aralkylene, and no group.

In some embodiments, the polymer is a salt formed with an anion selected from the group consisting of iodide, triiodide, hydroxide, chloride, bromide, fluoride, cyanide, acetate, carbonate, nitrate, sulfate, phosphate, triflate, and tosylate.

In some embodiments, the benzimidazolium-containing moiety is included in a main chain (i.e., the backbone) of the polymer.

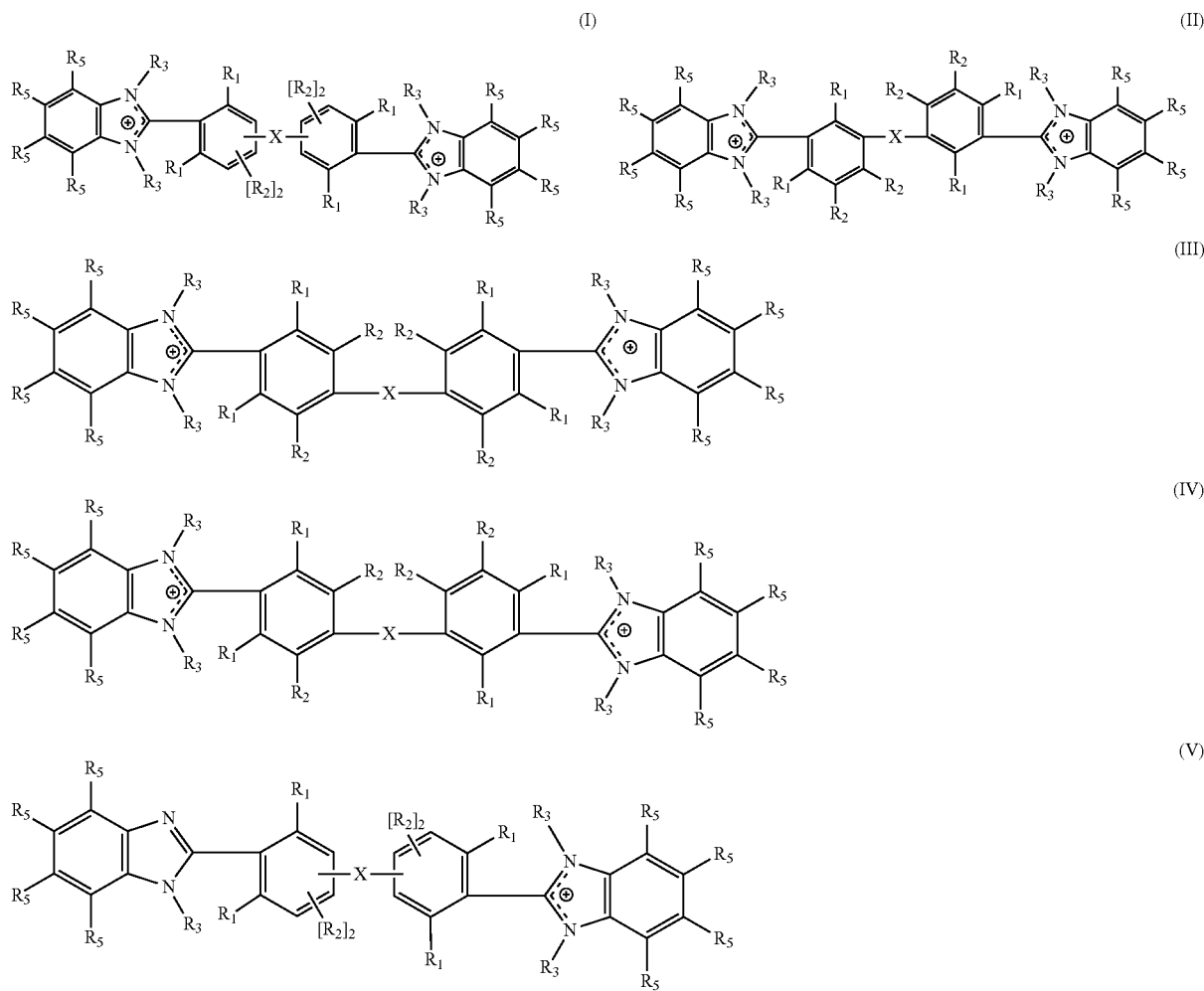

In some embodiments, the benzimidazolium-containing moiety is included in a pendant group of the polymer.

In some embodiments, the benzimidazolium-containing moiety is part of a crosslink of the polymer.

In some embodiments, the polymer further includes a second repeating unit defined by Formula (VI):

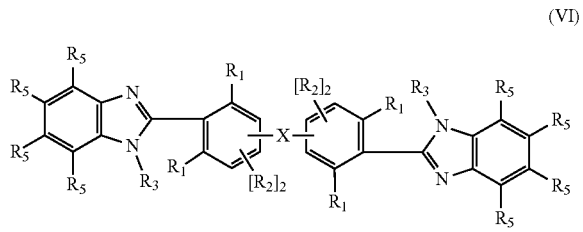

(VI)

wherein:

$R_1$ is independently selected from the group consisting of methyl, trifluoromethyl, alkyl, perfluoroalkyl, heteroalkyl, alkoxy, perfluoroalkoxy, halo, aryl, heteroaryl group and a polymer;

$R_2$ is independently selected from the group consisting of hydrogen, any group, and a polymer;

$R_3$ is independently selected from the group consisting of methyl, trifluoromethyl, alkyl, perfluoroalkyl, heteroalkyl, aryl, aralkyl, and a polymer;

$R_5$ is independently selected from the group consisting of hydrogen, any group, and a polymer;

wherein at least one of $R_1$, $R_2$, $R_3$, and $R_5$, is a polymer; and

X is independently selected from the group consisting of alkylene, perfluoroalkylene, heteroalkylene, arylene, aralkylene, and no group.

Without intending to be bound by theory, it is believed that the steric crowding of the benzimidazolium-containing moieties results from the interaction of the $R_3$ imidazolium or benzimidazolium groups in relation to relatively "bulky" groups at the $R_1$ position on the aryl ring. Accordingly, as noted above, the $R_1$ groups are at least as large as a methyl group. It is believed that the steric interactions between the $R_1$ and $R_3$ groups alter the geometry of the imidazolium or benzimidazolium-aryl bond such that the $R_1$ groups are situated in close proximity to the position in the imidazolium or benzimidazolium ring most prone to nucleophilic attack by hydroxide.

The benzimidazolium-containing moieties can be incorporated into a polymer in any manner known to those of skill in the art. Particularly, the moieties can be attached to a polymer chain at any of the $R_1$, $R_2$, $R_3$, or $R_5$ positions. As used herein, when an R-group is defined as a "polymer", that R-group location connects one of the benzimidazolium-containing moieties to a polymer chain. As discussed further herein, multiple R-groups can be "polymer" and the benzimidazolium-containing moieties can be incorporated into a polymer in a number of ways, including as part of the polymer backbone and/or as a pendant moiety.

In one embodiment, the benzimidazolium-containing moieties are incorporated in the polymer backbone, as described in further experimental detail below. As used herein, a monomer that is part of the main chain (or backbone) of a polymer is a repeating unit that is connected on at least two ends to the polymer chain. It will be appreciated that the moiety can be the only moiety in the backbone monomer: ─[benzimidazolium-containing moiety]─$_x$. Alternatively, the moiety can be one of a plurality of moieties in the backbone of the monomer: [benzimidazolium-containing moiety]$_x$[A]$_y$[B]$_z$.

In one embodiment, the benzimidazolium-containing moiety is incorporated as a pendant moiety attached to the backbone of the polymer. As used herein, the term "pendant" refers to a moiety that is attached at only one end to a polymer backbone.

It will be appreciated that the benzimidazolium-containing moieties may be directly connected to the polymer backbone or there may be additional moieties (e.g., linker groups) in between the moiety and the polymer backbone. Once again, attachment can come at any of the $R_1$, $R_2$, $R_3$, or $R_5$ positions.

Given the multiple available locations on the moieties for attachment to a polymer main chain, the moieties can be attached to multiple polymer chains (e.g., as part of a crosslink). An exemplary embodiment illustrating crosslinking between two polymer chains, $P_1$ and $P_2$, via the $R_3$ positions, is illustrated in Formula (VII) below. It will be appreciated that the crosslinking capabilities of the moieties are not limited to the illustrated embodiment.

(VII)

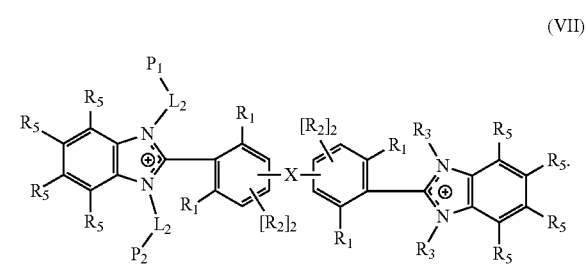

As described above, the polymer of the present disclosure includes one or more repeating units, wherein at least one of the repeating units includes one or more benzimidazolium-containing moieties of Formulas (I)-(V). In some embodiments, the polymer includes one or more repeat units, wherein at least one of the repeat units includes a benzimidazolium-containing moiety of Formula (I). In some embodiments, the polymer includes one or more repeat units, wherein at least one of the repeat units includes a benzimidazolium-containing moiety of Formula (II). In some embodiments, the polymer includes one or more repeat units, wherein at least one of the repeat units includes a benzimidazolium-containing moiety of Formula (III). In some embodiments, the polymer includes one or more repeat units, wherein at least one of the repeat units includes a benzimidazolium-containing moiety of Formula (IV). In some embodiments, the polymer includes one or more repeat units, wherein at least one of the repeat units includes a benzimidazolium-containing moiety of Formula (V). In some embodiments, the polymer includes one or more repeat units, wherein at least one of the repeat units includes a benzimidazolium-containing moiety of Formula (VI).

In some embodiments, the polymer includes one or more repeat units, wherein the one or more repeat units includes benzimidazolium-containing moieties of Formulas (I) and (II); Formulas (I) and (III); Formulas (I) and (IV); Formulas (I) and (V); Formulas (I) and (VI); Formulas (II) and (III); Formulas (II) and (IV); Formulas (II) and (V); Formulas (II) and (VI); Formulas (III) and (IV); Formulas (III) and (V); Formulas (III) and (VI); Formulas (IV) and (V); Formulas (IV) and (VI); or Formulas (V) and (VI).

In some embodiments, the polymer includes one or more repeat units, wherein the one or more repeat units include benzimidazolium-containing moieties of Formulas (I), (II), and (III); Formulas (I), (II), and (IV); Formulas (I), (II), and (V); Formulas (I), (II) and (VI); Formulas (I), (III), and (IV); Formulas (I), (III), and (V); Formulas (I), (III) and (VI); Formulas (I), (IV), and (V); Formulas (I), (IV) and (VI); Formulas (I), (V) and (VI); Formulas (II), (III), and (IV); Formulas (II), (III), and (V); Formulas (II), (III) and (VI); Formulas (II), (IV), and (V); Formulas (II), (IV), and (IV); Formulas (II), (V), and (VI); Formulas (III), (IV), and (V); Formulas (III), (IV), and (VI); Formulas (III), (V), and (VI); or Formulas (IV), (V), and (VI).

In some embodiments, the polymer includes one or more repeat units, wherein the one or more repeat units include benzimidazolium-containing moieties of Formulas (I), (V), and (VI). In some embodiments, the one or more repeat units of the polymer include benzimidazolium-containing moieties of Formulas (II), (III), (IV), (V), and (VI). In certain embodiments, the one or more repeat units of the polymer include benzimidazolium-containing moieties of Formulas (II), (V), and (VI).

The polymers as described above can have the following embodiments and features.

In some embodiments, $R_1$ is independently selected from the group consisting of methyl, trifluoromethyl, alkyl, perfluoroalkyl, heteroalkyl, alkoxy, perfluoroalkoxy, halo, aryl, and heteroaryl.

In some embodiments, $R_1$ is independently selected from the group consisting of methyl, trifluoromethyl, alkyl, perfluoroalkyl, heteroalkyl, alkoxy, and perfluoroalkoxy.

In some embodiments, $R_1$ is independently selected from the group consisting of methyl, trifluoromethyl, alkyl, perfluoroalkyl, and heteroalkyl.

In some embodiments, $R_1$ is independently selected from the group consisting of alkyl, perfluoroalkyl, and heteroalkyl.

In some embodiments, $R_1$ is alkyl.

In some embodiments, $R_1$ is methyl.

In some embodiments, $R_2$ is independently selected from the group consisting of hydrogen and any group.

In some embodiments, $R_2$ is independently selected from the group consisting of hydrogen and alkyl.

In some embodiments, $R_2$ is independently selected from the group consisting of hydrogen and methyl.

In some embodiments, $R_3$ is independently selected from the group consisting of methyl, trifluoromethyl, alkyl, perfluoroalkyl, heteroalkyl, aryl, and aralkyl.

In some embodiments, $R_3$ is independently selected from the group consisting of methyl, trifluoromethyl, alkyl, perfluoroalkyl, heteroalkyl, and aryl.

In some embodiments, $R_3$ is independently selected from the group consisting of methyl, trifluoromethyl, alkyl, perfluoroalkyl, and heteroalkyl.

In some embodiments, $R_3$ is independently selected from the group consisting of alkyl, perfluoroalkyl, and heteroalkyl.

In some embodiments, $R_3$ is alkyl.

In some embodiments, $R_3$ is methyl.

In some embodiments, $R_5$ is independently selected from the group consisting of hydrogen, alkyl, and a polymer.

In some embodiments, $R_5$ is independently selected from the group consisting of hydrogen and a polymer.

In some embodiments, X is independently selected from the group consisting of alkylene, perfluoroalkylene, heteroalkylene, arylene, aralkylene, and no group.

In some embodiments, X is independently selected from the group consisting of alkylene, arylene, and aralkylene.

In some embodiments, X is independently selected from the group consisting of alkylene and arylene.

In some embodiments, X is arylene.

In some embodiments, X is phenylene (e.g., 1,4-phenylene).

This disclosure also provides, inter alia, a copolymer of Formula (VIII)

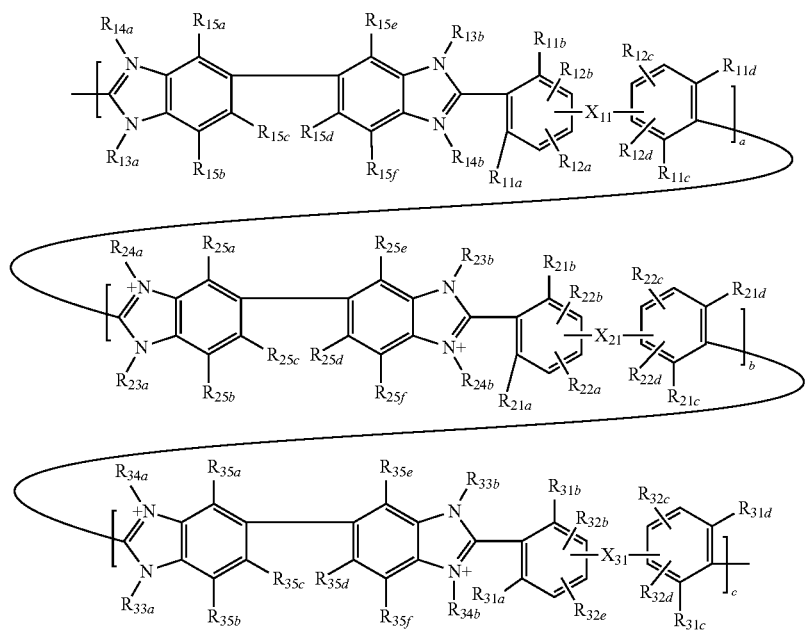

wherein:

$R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$R_{13a}$, $R_{13b}$, $R_{14a}$, and $R_{14b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that two of $R_{13a}$, $R_{13b}$, $R_{14a}$, and $R_{14b}$ are absent, and the remaining two are present and independently selected from $C_{1-6}$ alkyl, $C_{1-6}$ haloalkyl, $C_{1-6}$ alkoxy, $C_{1-6}$ haloalkoxy, halo, aryl, and heteroaryl.

$R_{23a}$, $R_{23b}$, $R_{24a}$, and $R_{24b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that one of $R_{23a}$, $R_{23b}$, $R_{24a}$ and $R_{24b}$ is absent, and the remaining three are present and independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{33a}$, $R_{33b}$, $R_{34a}$, and $R_{34b}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$X_{11}$, $X_{21}$, and $X_{31}$ are each independently selected from the group consisting of absent, $C_{1-6}$ alkylene, $C_{1-6}$ haloalkylene, arylene, and heteroarylene; and a, b, and c are mole percentages, wherein
a is from 0 mole percent to 45 mole percent,
b+c is 55 mole percent to 100 mole percent,
b and c are each more than 0 percent, and
a+b+c=100%.

In some embodiments, the copolymer of Formula (VIII) is a copolymer of Formula (VIIIa)

wherein:

$R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{12a}$, $R_{12c}$, $R_{22a}$, $R_{22c}$, $R_{32a}$, and $R_{32c}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$R_{13a}$, $R_{13b}$, $R_{14a}$, and $R_{14b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that two of $R_{13a}$, $R_{13b}$, $R_{14a}$, and $R_{14b}$ are absent, and the remaining two are present and independently selected from $C_{1-6}$ alkyl, $C_{1-6}$ haloalkyl, $C_{1-6}$ alkoxy, $C_{1-6}$ haloalkoxy, halo, aryl, and heteroaryl.

$R_{23a}$, $R_{23b}$, $R_{24a}$, and $R_{24b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that one of $R_{23a}$, $R_{23b}$, $R_{24a}$ and $R_{24b}$ is absent, and the remaining three are present and independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{33a}$, $R_{33b}$, $R_{34a}$, and $R_{34b}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$X_{11}$, $X_{21}$, and $X_{31}$ are each independently selected from the group consisting of absent, $C_{1-6}$ alkylene, $C_{1-6}$ haloalkylene, arylene, and heteroarylene; and a, b, and c are mole percentages, wherein
a is from 0 mole percent to 45 mole percent,
b+c is 55 mole percent to 100 mole percent,
b and c are each more than 0 percent, and
a+b+c=100%.

The copolymers of Formula (VIII) (and Formula (VIIIa)) as described above can have the following embodiments and features.

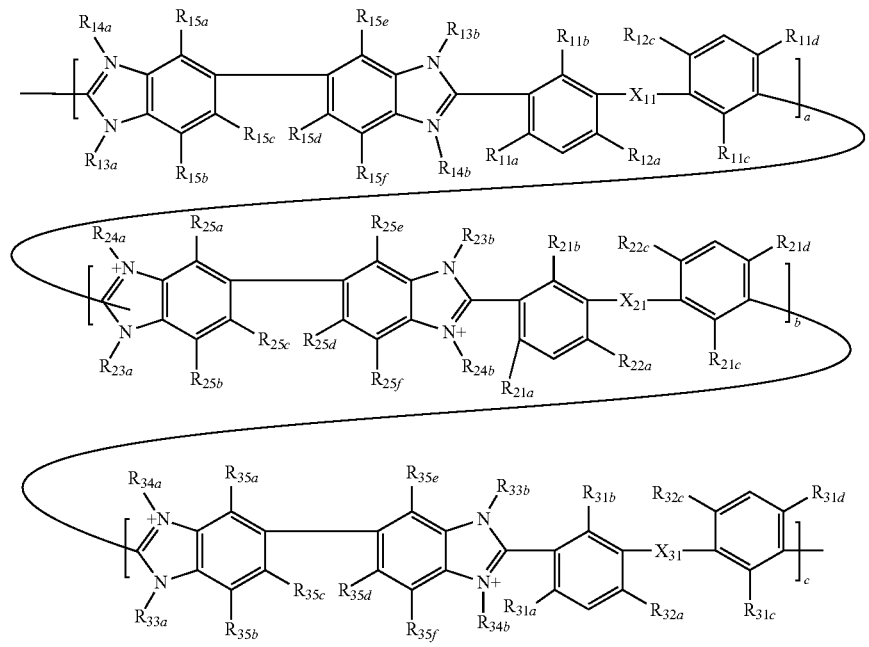

(VIIIa)

In some embodiments, the copolymers of Formula (VIII) (and Formula (VIIIa)) are random copolymers.

In some embodiments, the copolymers of Formula (VIII) (and Formula (VIIIa)) are block copolymers. Block copolymers can be made, for example, as described in Maity S. and Jana T., *Appl. Mater. Interfaces*, 2014, 6 (9), pp 6851-6864. For example, two separate homopolymers can be synthesized and then reacted together in another polymerization to provide a block copolymer. Post-polymerization functionalization (described in greater detail below) can then provide block copolymers having ionic amine backbones, where N-substitution is randomly distributed along the polymer chain.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl, $C_{1-6}$ haloalkyl, $C_{1-6}$ alkoxy, $C_{1-6}$ haloalkoxy, and halo.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl, $C_{1-6}$ haloalkyl, $C_{1-6}$ alkoxy, and $C_{1-6}$ haloalkoxy.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl and $C_{1-6}$ haloalkyl.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from methyl and ethyl.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each methyl.

In some embodiments, $R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each independently selected from H, $C_{1-6}$ alkyl, $C_{1-6}$ haloalkyl, $C_{1-6}$ alkoxy, $C_{1-6}$ haloalkoxy, and halo.

In some embodiments, $R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each independently selected from H, $C_{1-6}$ alkyl, $C_{1-6}$ haloalkyl, $C_{1-6}$ alkoxy, and $C_{1-6}$ haloalkoxy.

In some embodiments, $R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each independently selected from H, $C_{1-6}$ alkyl, and $C_{1-6}$ haloalkyl.

In some embodiments, $R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each independently selected from H and $C_{1-6}$ alkyl.

In some embodiments, $R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each independently selected from H, methyl, and ethyl.

In some embodiments, $R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each independently selected from H and methyl.

In some embodiments, $R_{12a}$, $R_{12c}$, $R_{22a}$, $R_{22c}$, $R_{32a}$, and $R_{32c}$ are each independently selected from H, $C_{1-6}$ alkyl, $C_{1-6}$ haloalkyl, $C_{1-6}$ alkoxy, $C_{1-6}$ haloalkoxy, and halo.

In some embodiments, $R_{12a}$, $R_{12c}$, $R_{22a}$, $R_{22c}$, $R_{32a}$, and $R_{32c}$ are each independently selected from H, $C_{1-6}$ alkyl, $C_{1-6}$ haloalkyl, $C_{1-6}$ alkoxy, and $C_{1-6}$ haloalkoxy.

In some embodiments, $R_{12a}$, $R_{12c}$, $R_{22a}$, $R_{22c}$, $R_{32a}$, and $R_{32c}$ are each independently selected from H, $C_{1-6}$ alkyl, and $C_{1-6}$ haloalkyl.

In some embodiments, $R_{12a}$, $R_{12c}$, $R_{22a}$, $R_{22c}$, $R_{32a}$, and $R_{32c}$ are each independently selected from H and $C_{1-6}$ alkyl.

In some embodiments, $R_{12a}$, $R_{12c}$, $R_{22a}$, $R_{22c}$, $R_{32a}$, and $R_{32c}$ are each independently selected from H, methyl, and ethyl.

In some embodiments, $R_{12a}$, $R_{12c}$, $R_{22a}$, $R_{22c}$, $R_{32a}$, and $R_{32c}$ are each independently selected from H and methyl.

In some embodiments, $R_{13a}$, $R_{13b}$, $R_{14a}$, and $R_{14b}$ are each independently selected from absent, $C_{1-6}$ alkyl, $C_{1-6}$ haloalkyl, $C_{1-6}$ alkoxy, $C_{1-6}$ haloalkoxy, and halo, provided that two of $R_{13a}$, $R_{13b}$, $R_{14a}$, and $R_{14b}$ are absent, and the remaining two are present and independently selected from $C_{1-6}$ alkyl, $C_{1-6}$ haloalkyl, $C_{1-6}$ alkoxy, $C_{1-6}$ haloalkoxy, and halo.

In some embodiments, $R_{13a}$, $R_{13b}$, $R_{14a}$, and $R_{14b}$ are each independently selected from absent, $C_{1-6}$ alkyl, $C_{1-6}$ haloalkyl, $C_{1-6}$ alkoxy, and $C_{1-6}$ haloalkoxy, provided that two of $R_{13a}$, $R_{13b}$, $R_{14a}$, and $R_{14b}$ are absent, and the remaining two are present and independently selected from $C_{1-6}$ alkyl, $C_{1-6}$ haloalkyl, $C_{1-6}$ alkoxy, and $C_{1-6}$ haloalkoxy.

In some embodiments, $R_{13a}$, $R_{13b}$, $R_{14a}$, and $R_{14b}$ are each independently selected from absent, $C_{1-6}$ alkyl, and $C_{1-6}$ haloalkyl, provided that two of $R_{13a}$, $R_{13b}$, $R_{14a}$, and $R_{14b}$ are absent, and the remaining two are present and independently selected from $C_{1-6}$ alkyl and $C_{1-6}$ haloalkyl.

In some embodiments, $R_{13a}$, $R_{13b}$, $R_{14a}$, and $R_{14b}$ are each independently selected from absent and $C_{1-6}$ alkyl, provided that two of $R_{13a}$, $R_{13b}$, $R_{14a}$, and $R_{14b}$ are absent, and the remaining two are present and independently selected from $C_{1-6}$ alkyl.

In some embodiments, $R_{13a}$, $R_{13b}$, $R_{14a}$, and $R_{14b}$ are each independently selected from absent, methyl, and ethyl, provided that two of $R_{13a}$, $R_{13b}$, $R_{14a}$, and $R_{14b}$ are absent, and the remaining two are present and independently selected from methyl and ethyl.

In some embodiments, $R_{13a}$, $R_{13b}$, $R_{14a}$, and $R_{14b}$ are each independently selected from absent and methyl, provided that two of $R_{13a}$, $R_{13b}$, $R_{14a}$, and $R_{14b}$ are absent, and the remaining two are present and are methyl.

In some embodiments, $R_{23a}$, $R_{23b}$, $R_{24a}$, and $R_{24b}$ are each independently selected from absent, $C_{1-6}$ alkyl, $C_{1-6}$ haloalkyl, $C_{1-6}$ alkoxy, $C_{1-6}$ haloalkoxy, and halo, provided that one of $R_{23a}$, $R_{23b}$, $R_{24a}$, and $R_{24b}$ is absent, and the remaining three are present and independently selected from $C_{1-6}$ alkyl, $C_{1-6}$ haloalkyl, $C_{1-6}$ alkoxy, $C_{1-6}$ haloalkoxy, and halo.

In some embodiments, $R_{23a}$, $R_{23b}$, $R_{24a}$, and $R_{24b}$ are each independently selected from absent, $C_{1-6}$ alkyl, $C_{1-6}$ haloalkyl, $C_{1-6}$ alkoxy, and $C_{1-6}$ haloalkoxy, provided that one of $R_{23a}$, $R_{23b}$, $R_{24a}$, and $R_{24b}$ is absent, and the remaining three are present and independently selected from $C_{1-6}$ alkyl, $C_{1-6}$ haloalkyl, $C_{1-6}$ alkoxy, and $C_{1-6}$ haloalkoxy.

In some embodiments, $R_{23a}$, $R_{23b}$, $R_{24a}$, and $R_{24b}$ are each independently selected from absent, $C_{1-6}$ alkyl, and $C_{1-6}$ haloalkyl, provided that one of $R_{23a}$, $R_{23b}$, $R_{24a}$, and $R_{24b}$ is absent, and the remaining three are present and independently selected from $C_{1-6}$ alkyl and $C_{1-6}$ haloalkyl.

In some embodiments, $R_{23a}$, $R_{23b}$, $R_{24a}$, and $R_{24b}$ are each independently selected from absent and $C_{1-6}$ alkyl, provided that one of $R_{23a}$, $R_{23b}$, $R_{24a}$, and $R_{24b}$ is absent, and the remaining three are present and independently selected from $C_{1-6}$ alkyl.

In some embodiments, $R_{23a}$, $R_{23b}$, $R_{24a}$, and $R_{24b}$ are each independently selected from absent, methyl, and ethyl, provided that one of $R_{23a}$, $R_{23b}$, $R_{24a}$, and $R_{24b}$ is absent, and the remaining three are present and independently selected from methyl and ethyl.

In some embodiments, $R_{23a}$, $R_{23b}$, $R_{24a}$, and $R_{24b}$ are each independently selected from absent and methyl, provided that one of $R_{23a}$, $R_{23b}$, $R_{24a}$, and $R_{24b}$ is absent, and the remaining three are present and are methyl.

In some embodiments, $R_{33a}$, $R_{33b}$, $R_{34a}$, and $R_{34b}$ are each independently selected from $C_{1-6}$ alkyl, $C_{1-6}$ haloalkyl, $C_{1-6}$ alkoxy, $C_{1-6}$ haloalkoxy, and halo.

In some embodiments, $R_{33a}$, $R_{33b}$, $R_{34a}$, and $R_{34b}$ are each independently selected from $C_{1-6}$ alkyl, $C_{1-6}$ haloalkyl, $C_{1-6}$ alkoxy, and $C_{1-6}$ haloalkoxy.

In some embodiments, $R_{33a}$, $R_{33b}$, $R_{34a}$, and $R_{34b}$ are each independently selected from $C_{1-6}$ alkyl and $C_{1-6}$ haloalkyl.

In some embodiments, $R_{33a}$, $R_{33b}$, $R_{34a}$, and $R_{34b}$ are each independently selected from $C_{1-6}$ alkyl.

In some embodiments, $R_{33a}$, $R_{33b}$, $R_{34a}$, and $R_{34b}$ are each independently selected from methyl and ethyl.

In some embodiments, $R_{33a}$, $R_{33b}$, $R_{34a}$, and $R_{34b}$ are each independently methyl.

In some embodiments, $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H, $C_{1-6}$ alkyl, $C_{1-6}$ haloalkyl, $C_{1-6}$ alkoxy, $C_{1-6}$ haloalkoxy, and halo.

In some embodiments, $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H, $C_{1-6}$ alkyl, and $C_{1-6}$ haloalkyl.

In some embodiments, $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H and $C_{1-6}$ alkyl.

In some embodiments, $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each H.

In some embodiments, $X_{11}$, $X_{21}$, and $X_{31}$ are each independently selected from the group consisting of $C_{1-6}$ alkylene, $C_{1-6}$ haloalkylene, arylene, and heteroarylene.

In some embodiments, $X_{11}$, $X_{21}$, and $X_{31}$ are each independently selected from the group consisting of arylene and heteroarylene.

In some embodiments, $X_{11}$, $X_{21}$, and $X_{31}$ are each independently selected from arylene.

In some embodiments, $X_{11}$, $X_{21}$, and $X_{31}$ are each phenylene (e.g., 1,4-phenylene).

In some embodiments, a, b, and c are mole percentages, wherein
a is 5 mole percent or more,
b+c is 95 mole percent or less,
b and c are each more than 0 percent, and
a+b+c=100%.

In some embodiments, a, b, and c are mole percentages, wherein
a is from 5 mole percent to 45 mole percent,
b+c is 55 mole percent to 95 mole percent,
b and c are each more than 0 percent, and
a+b+c=100%.

In some embodiments, a, b, and c are mole percentages, wherein
a is from 2 mole percent to 45 mole percent,
b+c is 55 mole percent to 98 mole percent,
b and c are each more than 0 percent, and
a+b+c=100%.

In some embodiments, a, b, and c are mole percentages, wherein
a is from 0 mole percent to 45 mole percent,
b+c is 55 mole percent to 100 mole percent,
b and c are each more than 0 percent, and
a+b+c=100%.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl; $R_{12a}$, $R_{12c}$, $R_{22a}$, $R_{22c}$, $R_{32a}$, and $R_{32c}$ are each independently selected from H and $C_{1-6}$ alkyl; $R_{13a}$, $R_{13b}$, $R_{14a}$, and $R_{14b}$ are each independently selected from absent, $C_{1-6}$ alkyl, and $C_{1-6}$ haloalkyl, provided that two of $R_{13a}$, $R_{13b}$, $R_{14a}$, and $R_{14b}$ are absent, and the remaining two are present and independently selected from $C_{1-6}$ alkyl and $C_{1-6}$ haloalkyl; $R_{23a}$, $R_{23b}$, $R_{24a}$, and $R_{24b}$ are each independently selected from absent, $C_{1-6}$ alkyl, and $C_{1-6}$ haloalkyl, provided that one of $R_{23a}$, $R_{23b}$, $R_{24a}$, and $R_{24b}$ is absent, and the remaining three are present and independently selected from $C_{1-6}$ alkyl and $C_{1-6}$ haloalkyl; $R_{33a}$, $R_{33b}$, $R_{34a}$, and $R_{34b}$ are each independently selected from $C_{1-6}$ alkyl and $C_{1-6}$ haloalkyl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H and $C_{1-6}$ alkyl; $X_{11}$, $X_{21}$, and $X_{31}$ are each independently selected from arylene; a, b, and c are mole percentages, wherein a is from 2 mole percent to 45 mole percent, b+c is 55 mole percent to 98 mole percent, b and c are each more than 0 percent, and a+b+c=100%.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl; $R_{12a}$, $R_{12c}$, $R_{22a}$, $R_{22c}$, $R_{32a}$, and $R_{32c}$ are each independently selected from H and $C_{1-6}$ alkyl; $R_{13a}$, $R_{13b}$, $R_{14a}$, and $R_{14b}$ are each independently selected from absent and $C_{1-6}$ alkyl, provided that two of $R_{13a}$, $R_{13b}$, $R_{14a}$, and $R_{14b}$ are absent, and the remaining two are present and independently selected from $C_{1-6}$ alkyl; $R_{23a}$, $R_{23b}$, $R_{24a}$, and $R_{24b}$ are each independently selected from absent and $C_{1-6}$ alkyl, provided that one of $R_{23a}$, $R_{23b}$, $R_{24a}$, and $R_{24b}$ is absent, and the remaining three are present and independently selected from $C_{1-6}$ alkyl; $R_{33a}$, $R_{33b}$, $R_{34a}$, and $R_{34b}$ are each independently selected from $C_{1-6}$ alkyl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H and $C_{1-6}$ alkyl; $X_{11}$, $X_{21}$, and $X_{31}$ are each independently selected from arylene; a, b, and c are mole percentages, wherein a is from 2 mole percent to 45 mole percent, b+c is 55 mole percent to 98 mole percent, b and c are each more than 0 percent, and a+b+c=100%.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from methyl and ethyl; $R_{12a}$, $R_{12c}$, $R_{22a}$, $R_{22c}$, $R_{32a}$, and $R_{32c}$ are each independently selected from H, methyl, and ethyl; $R_{13a}$, $R_{13b}$, $R_{14a}$, and $R_{14b}$ are each independently selected from absent, methyl, and ethyl, provided that two of $R_{13a}$, $R_{13b}$, $R_{14a}$, and $R_{14b}$ are absent, and the remaining two are present and independently selected from methyl and ethyl; $R_{23a}$, $R_{23b}$, $R_{24a}$, and $R_{24b}$ are each independently selected from absent, methyl, and ethyl, provided that one of $R_{23a}$, $R_{23b}$, $R_{24a}$, and $R_{24b}$ is absent, and the remaining three are present and independently selected from methyl and ethyl; $R_{33a}$, $R_{33b}$, $R_{34a}$, and $R_{34b}$ are each independently selected from methyl and ethyl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each H; $X_{11}$, $X_{21}$, and $X_{31}$ are each independently selected from arylene; a, b, and c are mole percentages, wherein a is from 0 mole percent to 45 mole percent, b+c is 55 mole percent to 100 mole percent, b and c are each more than 0 percent, and a+b+c=100%.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from methyl and ethyl; $R_{12a}$, $R_{12c}$, $R_{22a}$, $R_{22c}$, $R_{32a}$, and $R_{32c}$ are each independently selected from H, methyl, and ethyl; $R_{13a}$, $R_{13b}$, $R_{14a}$, and $R_{14b}$ are each independently selected from absent, methyl, and ethyl, provided that two of $R_{13a}$, $R_{13b}$, $R_{14a}$, and $R_{14b}$ are absent, and the remaining two are present and independently selected from methyl and ethyl; $R_{23a}$, $R_{23b}$, $R_{24a}$, and $R_{24b}$ are each independently selected from absent, methyl, and ethyl, provided that one of $R_{23a}$, $R_{23b}$, $R_{24a}$, and $R_{24b}$ is absent, and the remaining three are present and independently selected from methyl and ethyl; $R_{33a}$, $R_{33b}$, $R_{34a}$, and $R_{34b}$ are each independently selected from methyl and ethyl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each H; $X_{11}$, $X_{21}$, and $X_{31}$ are each independently selected from arylene; a, b, and c are mole percentages, wherein a is from 2 mole percent to 45 mole percent, b+c is 55 mole percent to 98 mole percent, b and c are each more than 0 percent, and a+b+c=100%.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each methyl; $R_{12a}$, $R_{12c}$, $R_{22a}$, $R_{22c}$, $R_{32a}$, and $R_{32c}$ are each independently selected from H and methyl; $R_{13a}$, $R_{13b}$, $R_{14a}$, and $R_{14b}$ are each independently selected from absent and methyl, provided that two of $R_{13a}$, $R_{13b}$, $R_{14a}$, and $R_{14b}$ are absent, and the remaining two are present and are methyl; $R_{23a}$, $R_{23b}$, $R_{24a}$, and $R_{24b}$ are each independently selected from absent and methyl, provided that one of $R_{23a}$, $R_{23b}$, $R_{24a}$, and $R_{24b}$ is absent, and the remaining three are present and are methyl; $R_{33a}$, $R_{33b}$, $R_{34a}$, and $R_{34b}$ are each independently methyl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each H; $X_{11}$, $X_{21}$, and $X_{31}$ are each independently selected from arylene; a, b, and c are mole percentages, wherein a is from 2 mole percent to 45 mole percent, b+c is 55 mole percent to 98 mole percent, b and c are each more than 0 percent, and a+b+c=100%.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each methyl; $R_{12a}$, $R_{12c}$, $R_{22a}$, $R_{22c}$, $R_{32a}$, and $R_{32c}$ are each independently selected from H and methyl; $R_{13a}$, $R_{13b}$, $R_{14a}$, and $R_{14b}$ are each independently selected from absent and methyl, provided that two of $R_{13a}$, $R_{13b}$, $R_{14a}$, and $R_{14b}$ are absent, and the remaining two are present and are methyl; $R_{23a}$, $R_{23b}$, $R_{24a}$, and $R_{24b}$ are each independently selected from absent and methyl, provided that one of $R_{23a}$, $R_{23b}$, $R_{24a}$, and $R_{24b}$ is absent, and the remaining three are present and are methyl; $R_{33a}$, $R_{33b}$, $R_{34a}$, and $R_{34b}$ are each independently methyl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each H; $X_{11}$, $X_{21}$, and $X_{31}$ are each independently selected from arylene; a, b, and c are mole percentages, wherein a is from 0 mole percent to 45 mole percent, b+c is 55 mole percent to 100 mole percent, b and c are each more than 0 percent, and a+b+c=100%.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each methyl; $R_{12a}$, $R_{12c}$, $R_{22a}$, $R_{22c}$, $R_{32a}$, and $R_{32c}$ are each independently selected from H and methyl; $R_{13a}$, $R_{13b}$, $R_{14a}$, and $R_{14b}$ are each independently selected from absent and methyl, provided that two of $R_{13a}$, $R_{13b}$, $R_{14a}$, and $R_{14b}$ are absent, and the remaining two are present and are methyl; $R_{23a}$, $R_{23b}$, $R_{24a}$, and $R_{24b}$ are each independently selected from absent and methyl, provided that one of $R_{23a}$, $R_{23b}$, $R_{24a}$, and $R_{24b}$ is absent, and the remaining three are present and are methyl; $R_{33a}$, $R_{33b}$, $R_{34a}$, and $R_{34b}$ are each independently methyl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each H; $X_{11}$, $X_{21}$, and $X_{31}$ are each phenylene (e.g., 1,4-phenylene); a, b, and c are mole percentages, wherein a is from 2 mole percent to mole percent, b+c is 55 mole percent to 98 mole percent, b and c are each more than 0 percent, and a+b+c=100%.

In some embodiments, $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each methyl; $R_{12a}$, $R_{12c}$, $R_{22a}$, $R_{22c}$, $R_{32a}$, and $R_{32c}$ are each independently selected from H and methyl; $R_{13a}$, $R_{13b}$, $R_{14a}$, and $R_{14b}$ are each independently selected from absent and methyl, provided that two of $R_{13a}$, $R_{13b}$, $R_{14a}$, and $R_{14b}$ are absent, and the remaining two are present and are methyl; $R_{23a}$, $R_{23b}$, $R_{24a}$, and $R_{24b}$ are each independently selected from absent and methyl, provided that one of $R_{23a}$, $R_{23b}$, $R_{24a}$, and $R_{24b}$ is absent, and the remaining three are present and are methyl; $R_{33a}$, $R_{33b}$, $R_{34a}$, and $R_{34b}$ are each independently methyl; $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each H; $X_{11}$, $X_{21}$, and $X_{31}$ are each phenylene (e.g., 1,4-phenylene); a, b, and c are mole percentages, wherein a is from 0 mole percent to mole percent, b+c is 55 mole percent to 100 mole percent, b and c are each more than 0 percent, and a+b+c=100%.

In some embodiments, the degree of N-substitution (e.g., N-alkylation) in the polymers of the present disclosure is from greater than 50 mole percent (e.g., from 60 mole percent, from 70 mole percent, from 80 mole percent, or from 90 mole percent) to about 95 mole percent (to about 92 mole percent, to about 90 mole percent, to about 80 mole percent, to about 70 mole percent, or to about 60 mole percent).

In certain embodiment, the described cationic benzimidazolium-containing moieties or the polymer of Formula (VIII) or (VIIIa) form a salt with an anion. Any anion sufficient to balance the charge of the moiety-containing polymer can be used. Representative anions include iodide, hydroxide, chloride, bromide, fluoride, cyanide, acetate, carbonate, nitrate, sulfate, triiodide, phosphate, triflate, and tosylate.

The polymers containing the moieties and the polymers of Formula (VIII) or (VIIIa) can be of any size known to those of skill in the art.

General Synthetic Scheme

The polymers of the present disclosure can be prepared in a variety of ways known to one skilled in the art of organic synthesis. The polymers of the present disclosure can be synthesized using the methods as hereinafter described below and in the Examples, together with synthetic methods known in the art of synthetic organic chemistry or variations thereon as appreciated by those skilled in the art.

The polymers of this disclosure can be prepared from readily available starting materials using the following general methods and procedures. It will be appreciated that where typical or preferred process conditions (i.e., reaction temperatures, times, mole ratios of reactants, solvents, pressures, etc.) are given; other process conditions can also be used unless otherwise stated. Optimum reaction conditions may vary with the particular reactants or solvent used, but such conditions can be determined by one skilled in the art by routine optimization procedures.

The processes described herein can be monitored according to any suitable method known in the art. For example, product formation can be monitored by spectroscopic means, such as nuclear magnetic resonance spectroscopy (e.g., $^1$H or $^{13}$C) infrared spectroscopy, spectrophotometry (e.g., UV-visible), or mass spectrometry, or by chromatography such as high performance liquid chromatography (HPLC) or thin layer chromatography.

Preparation of polymers and compounds can involve the protection and deprotection of various chemical groups. The need for protection and deprotection, and the selection of appropriate protecting groups can be readily determined by one skilled in the art. The chemistry of protecting groups can be found, for example, in Greene, et al., *Protective Groups in Organic Synthesis*, 4th. Ed., Wiley & Sons, 2006.

The reactions of the processes described herein can be carried out in suitable solvents which can be readily selected by one of skill in the art of organic synthesis. Suitable solvents can be substantially nonreactive with the starting materials (reactants), the intermediates, or products at the temperatures at which the reactions are carried out, i.e., temperatures which can range from the solvent's freezing temperature to the solvent's boiling temperature. A given reaction can be carried out in one solvent or a mixture of more than one solvent. Depending on the particular reaction step, suitable solvents for a particular reaction step can be selected.

The polymers and compounds of the disclosure can be prepared, for example, using the reaction pathways and techniques as described in FIG. 1, where steps (a)-(j) are as follows: a) bromination using, for example, bromine and acetic acid (AcOH); b) and c) ester formation using, for example, KOH followed by MeI; d) coupling to 1,4-phenylene using, for example, 1,4-phenylenediboronic acid, $K_2CO_3$, and catalytic $Pd(PPh_3)_4$; e) and f) de-esterification using, for example, $H_2SO_4$ followed by $H_2O$; g) formation of polymer using condensation polymerization (e.g., 3,3'-diaminobenzidine, Eaton's reagent, heat); h) deprotonation (e.g., using KOH) and i) nucleophilic N-substitution (e.g., using MeI); and j) controlled nucleophilic N-substitution (e.g., using stoichiometric MeI). In some embodiments, steps e) and f) can be omitted.

In some embodiments, once a neutral polymer having a benzimidazole moiety has been synthesized (e.g., HMT-PBI), the polymer can be functionalized to provide a N-substituted polymer (e.g., 50% dm HMT-PMBI). The post-polymerization functionalization includes deprotonating the benzimidazole-containing polymer with an alkali hydroxide by heating in a polar aprotic solvent and optionally with a minimal amount of water to provide a deprotonated benzimidazole-containing polymer. In some embodiments, the polymer is not initially soluble in the solvent but once the reaction is complete, the deprotonated polymer is dissolved and remains soluble once cooled to room temperature. In some embodiments, the alkali hydroxide is potassium hydroxide and the solvent is dimethylsulfoxide. In some embodiments, the deprotonated benzimidazole-containing polymer mixture can be filtered and washed to remove impurities and unreacted alkali hydroxides. The post-polymerization functionalization can further include adding excess R—Y to the polymer solution and stirring to provide a neutral N-substituted polymer (e.g., a polymer containing Formula VI, or HMT-PMBI in FIG. 1), wherein R represents a methyl, trifluoromethyl, alkyl, perfluoroalkyl, heteroalkyl, aryl, or aralkyl group, and wherein Y represents an anionic leaving group comprising iodide, bromide, chloride, or sulfonate ester.

The N-substituted neutral polymer generated above can be further N-substituted to provide a cationic polymer (e.g., a cationic polymer containing Formulas I, V, and VI, or >50% dm HMT-PMBI). The N-substitution can include dissolving the N-substituted neutral polymer in a suitable organic solvent (e.g., dimethylsulfoxide) to provide a polymer solution; adding a known amount of R—Y to the polymer solution and stirring the polymer solution for a period of time to provide the cationic N-substituted polymer (e.g., a cationic polymer containing Formulas I, V and VI, wherein greater amounts of R—Y and longer reaction times lead to a greater molar ratio in the order of Formulas I>V>VI; or a >50% dm HMT-PMBI).

Membrane Formation

In another aspect, an ionic membrane is provided. In one embodiment, the ionic membrane includes a cationic polymer incorporating the moiety of any of the Formulas (I)-(VI) or a polymer of Formulas (VIII) or (VIIIa) disclosed herein. The membranes created from these polymers are stable in high pH environments, a feat that most present technologies are not capable of withstanding.

As an example, the ionic membrane can include a polymer of Formula (VIII) (e.g., a polymer of Formula (VIIIa)), as described above.

For example, the ionic membrane can include a polymer that includes one or more repeat units, wherein at least one of the repeat units includes a benzimidazolium-containing moiety of Formula (I). In some embodiments, the ionic membrane includes a polymer that includes one or more repeat units, wherein at least one of the repeat units includes a benzimidazolium-containing moiety of Formula (II). In some embodiments, the ionic membrane includes a polymer that includes one or more repeat units, wherein at least one of the repeat units includes a benzimidazolium-containing moiety of Formula (III). In some embodiments, the ionic membrane includes a polymer that includes one or more repeat units, wherein at least one of the repeat units includes a benzimidazolium-containing moiety of Formula (IV). In some embodiments, the ionic membrane includes a polymer that includes one or more repeat units, wherein at least one of the repeat units includes a benzimidazolium-containing moiety of Formula (V). In some embodiments, the ionic membrane includes a polymer that includes one or more repeat units, wherein at least one of the repeat units includes a benzimidazolium-containing moiety of Formula (VI).

In some embodiments, the ionic membrane includes a polymer that includes one or more repeat units, wherein the one or more repeat units includes benzimidazolium-containing moieties of Formulas (I) and (II); Formulas (I) and (III); Formulas (I) and (IV); Formulas (I) and (V); Formulas (I) and (VI); Formulas (II) and (III); Formulas (II) and (IV); Formulas (II) and (V); Formulas (II) and (VI); Formulas (III) and (IV); Formulas (III) and (V); Formulas (III) and (VI); Formulas (IV) and (V); Formulas (IV) and (VI); or Formulas (V) and (VI).

In some embodiments, the ionic membrane includes a polymer that includes one or more repeat units, wherein the one or more repeat units includes benzimidazolium-containing moieties of Formulas (I), (II), and (III); Formulas (I), (II), and (IV); Formulas (I), (II), and (V); Formulas (I), (II) and (VI); Formulas (I), (III), and (IV); Formulas (I), (III), and (V); Formulas (I), (III) and (VI); Formulas (I), (IV), and (V); Formulas (I), (IV) and (VI); Formulas (I), (V) and (VI); Formulas (II), (III), and (IV); Formulas (II), (III), and (V); Formulas (II), (III) and (VI); Formulas (II), (IV), and (V); Formulas (II), (IV), and (IV); Formulas (II), (V), and (VI); Formulas (III), (IV), and (V); Formulas (III), (IV), and (VI); Formulas (III), (V), and (VI); or Formulas (IV), (V), and (VI).

In some embodiments, the polymer includes one or more repeat units, wherein the one or more repeat units include benzimidazolium-containing moieties of Formulas (I), (V), and (VI). In some embodiments, the one or more repeat units of the polymer include benzimidazolium-containing moieties of Formulas (II), (III), (IV), (V), and (VI). In certain embodiments, the one or more repeat units of the polymer include benzimidazolium-containing moieties of Formulas (II), (V), and (VI).

In some embodiments, the polymers of the present disclosure can be readily dissolved in alcoholic solvents, such as methanol, ethanol, and propanol, as well as organic solvents, such as dimethylsulfoxide. Once dissolved, the polymeric solution can be drop-cast onto a substrate, and a free-standing film of the polymer can be obtained once the solvent has evaporated under appropriately controlled temperature and pressure conditions. In other embodiments, a solution including a dissolved polymer can be spray-coated, dip-coated, or otherwise applied onto a substrate.

A sterically C2-protected poly(benzimidazole) derivative incorporating a hexamethyl-p-terphenylene group is described in Examples 1 and 2 below. Using a scalable and air-insensitive methylation procedure, N-methylation of the polymer was controlled to yield a hydroxide-stable, methanol-soluble, and water-insoluble poly(benzimidazolium) ionene. This polymer, after N-methylation, was also soluble in aqueous ethanol, which made it suitable for use as a processable ionomer for catalyst layers. The water uptake and ionic conductivity were correlated to the degree of N-methylation. The anion conductivity reached 9.7±0.6 mS cm$^{-1}$ for polymers with a 92% degree of methylation. Additionally, the hexamethyl-p-terphenylene unit showed interesting atropisomerism which may influence their physical properties.

EXAMPLES

All chemicals were obtained from Caledon Laboratories Ltd. unless otherwise stated. Mesitoic acid (98%) and 1,4-phenylenediboronic acid (97%) were purchased from Combi-Blocks, Inc. Potassium deuteroxide solution (40 wt. % in $D_2O$, 98 atom % D), 3,3'-diaminobenzidine (>99% by HPLC), dichloromethane (HPLC grade), and chloroform (HPLC grade) were purchased from Sigma-Aldrich. Tetrakis (triphenylphosphine)palladium(0) (99%) was purchased from Strem Chemicals Inc. Dimethyl sulfoxide (anhydrous, packed under argon) and 1,4-dioxane (99+%) were purchased from Alfa Aesar. Methylene chloride-$d_2$ (D, 99.9%), dimethyl sulfoxide-$d_6$ (D, 99.9%), methanol-$d_4$ (D, 99.8%), and deuterium oxide (D, 99.9%) were purchased from Cambridge Isotope Laboratories, Inc. Degradation experiments were performed in 15 mL polypropylene conical tubes (BD Falcon). 3,3'-diaminobenzidine was purified according to literature procedures. Deionized water was purified using a Millipore Gradient Milli-Q® water purification system at 18.2 MΩ cm. $^1$H NMR and $^{13}$C NMR were obtained on a 500 MHz Bruker AVANCE III running IconNMR under TopSpin 2.1 instruments and the residual solvent peaks for DMSO-$d_6$, CDCl$_3$, CD$_2$Cl$_2$, and CD$_3$OD were set to 2.50 ppm, 7.26 ppm, 5.32 ppm, and 3.31 ppm for $^1$H NMR spectra, respectively, and 39.52 ppm and 77.16 ppm for $^{13}$C NMR spectra of DMSO-$d_6$ and CDCl$_3$, respectively.

General Synthetic Scheme

A general synthetic scheme of HMT-PMBI polymer is shown in FIG. 1.

Referring to FIG. 1, the reagents and conditions for reaction steps (a)-(j) are as follows: (a) bromine, acetic acid (AcOH), 2 h, rt, 74% yield; (b) KOH, DMSO, rt, 15 min; (c) MeI, 2 h, rt, 93% over two steps; (d) 1,4-phenylenediboronic acid, 2M K$_2$CO$_3$, 1,4-dioxane, 0.2 mol % Pd(PPh$_3$)$_4$, reflux, 22 h, 60%; (e) H$_2$SO$_4$, 30 min, rt; (f) H$_2$O, 15 min, 97% over two steps; (g) 3,3'-diaminobenzidine, Eaton's reagent, 120-140° C., 1.5 h, 102%; (h) KOH, DMSO, 70° C., 30 min; (i) MeI, rt, 3 min, 84% over two steps; and (j) MeI, dichloromethane (DCM), 30° C., 16-18 h.

Synthesis of 3-bromomesitoic acid (1)

Compound 1 was synthesized as described in Beringer, F. M.; Sands, S. *J. Am. Chem. Soc.* 1953, 75, 3319-3322. More specifically, mesitoic acid (39.41 g, 240 mmol) was dissolved in 560 mL of glacial acetic acid. A separate solution containing bromine (12.3 mL, 239 mmol) and 160 mL of glacial acetic acid was then added and the resulting solution was stirred for 2 hours at room temperature. The solution was then poured into 3 L of stirring, distilled water and the precipitate was filtered. After washing the white solid with water, the solid was recrystallized twice from ethanol/water and the collected solid was dried at 70° C. under vacuum, resulting in 43.1 g (74% yield) of 1 as white needles. $^1$H NMR (500 MHz, DMSO-$d_6$, δ 13.34 (s, 1H), 7.09 (s, 1H), 2.32 (m, 6H), 2.19 (s, 3H). $^{13}$C NMR (125 MHz, DMSO-$d_6$, δ 170.47, 138.54, 135.56, 133.30, 132.64, 130.39, 124.89, 23.88, 21.32, 19.16.

Synthesis of methyl 3-bromomesitoate (2)

Compound 2 was synthesized using a generalized methylation procedure as described, for example, in Avila-Zirraga, J. G.; Martinez, R. *Synth. Commun.* 2001, 31, 2177-2183. More specifically, powdered potassium hydroxide (14.82 g, 264 mmol) was vigorously stirred in dimethyl sulfoxide (300 mL) at room temperature for 30 minutes. A solution containing 1 (43.1 g, 177 mmol) dissolved in dimethyl sulfoxide (150 mL) was added to the previous solution. After 15 minutes of stirring, iodomethane (16.3 mL, 262 mmol) was added and stirred for 2 hours. The mixture was then poured into a stirring solution of potassium hydroxide (10.0 g) in 3 L of ice-water. The precipitate was filtered, thoroughly washed with distilled water, briefly dried under vacuum at 80° C. (melt), and cooled back to room temperature to yield 42.1 g (93% yield) of 2 as a colourless crystal. $^1$H NMR (500 MHz, DMSO-$d_6$, δ 7.11 (s, 1H), 3.85 (s, 3H), 2.33 (s, 3H), 2.26 (s, 3H), 2.15 (s, 3H). $^{13}$C NMR (125 MHz, DMSO-$d_6$, δ 168.85, 138.92, 133.59, 133.30, 132.94, 130.01, 124.46, 52.24, 23.44, 20.84, 18.59.

Synthesis of dimethyl 2,2",4,4",6,6"-hexamethyl-p-terphenyl-3,3"-diester (3)

In an argon-purged 1 L round-bottom flask with stirbar and condenser, 2 (25.00 g, 97.2 mmol), 1,4-phenylenediboronic acid (8.16 g, 49.2 mmol), 1,4-dioxane (500 mL), 2M K$_2$CO$_3$ (156 mL), and aliquat 336 (6 drops) were added. The mixture was bubbled with argon for 20 minutes and tetrakis (triphenylphosphine)palladium(0) (0.198 g, 0.2 mol %) was added. After refluxing for 22 hours under argon, the solution was cooled to 80° C. and poured into a stirring, 55° C. solution of ethanol (800 mL)-water (1000 mL). The mixture was slowly cooled to room temperature and the resulting precipitate was filtered, washed with water, and dried. The solid was purified by flash chromatography on silica with chloroform. The collected and dried product was recrystallized in hexanes and dried under vacuum at 110° C., resulting in 12.61 g (60% yield) of 3 as small white crystals. $^1$H NMR (500 MHz, CDCl$_3$, δ 7.15 (s, 4H), 7.01 (s, 2H), 3.93 (s, 6H), 2.33 (s, 6H), 2.05-2.02 (m, 12H). $^{13}$C NMR (125 MHz, CDCl$_3$, δ 171.09, 139.79, 139.05, 137.70, 137.68, 133.44, 132.79, 132.78, 132.28, 132.26, 129.46, 129.16, 129.15, 52.05, 21.02, 20.98, 19.55, 18.17, 18.13.

Synthesis of 2,2'',4,4'',6,6''-hexamethyl-p-terphenyl-3,3'-dicarboxylic acid (4)

In a 100 mL round-bottom flask with stirbar were added 3 (12.00 g, 27.9 mmol) and concentrated sulfuric acid (75 mL). The mixture was vigorously stirred for 30 minutes at room temperature, where all of the solid was dissolved. The solution was then poured into stirring distilled water (2 L) and stirred for 15 minutes. The precipitate was filtered, thoroughly washed with water, and dried under vacuum at 110° C. The collected solid was moved into a 250 mL round-bottom flask and stirred in concentrated sulfuric acid (100 mL) for 45 minutes. The fully dissolved solution was then poured into stirring distilled water (2 L) and stirred for 15 minutes. After filtering the precipitate, washing thoroughly with water, and drying under vacuum at 110° C., 10.92 g of 4 (97% yield) was collected as an off-white powder and used without further purification. $^1$H NMR (500 MHz, DMSO-$d_6$, δ 7.18 (s, 4H), 7.04 (s, 2H), 2.28 (s, 6H), 1.99 (s, 6H), 1.97 (s, 6H). $^{13}$C NMR (125 MHz, DMSO-$d_6$, δ 171.08, 139.05, 138.56, 136.03, 136.00, 133.87, 132.02, 131.00, 130.98, 129.24, 128.73, 20.50, 20.44, 19.06, 17.79, 17.73.

Synthesis of poly[2,2'-(2,2'',4,4'',6,6''-hexamethyl-p-terphenyl-3,3''-diyl)-5,5'-bibenzimidazole] (HMT-PBI)

In a 500 mL, 3-neck round-bottom flask with a $CaCl_2$ drying tube, glass stopper, and argon inlet, was added 4 (10.0003 g, 24.85 mmol), 3,3'-diaminobenzidine (5.3240 g, 24.85 mmol), and Eaton's reagent (400 mL). The vigorously stirred mixture was heated to 120° C. for 30 minutes under argon flow and then increased to 140° C. for 1 hour. The solution was then poured into 3 L of stirring distilled water to precipitate the polymer. The material was filtered, thoroughly washed with water, and then stirred in 3 L of distilled water containing potassium carbonate (200 g) for 2 days at room temperature. The material was filtered again, washed with water, boiling water, and then with acetone, and dried under vacuum at 110° C., resulting in 13.8 g of HMT-PBI (102% yield) as light brown, paper-like-textured solid. The $^1$H NMR, as shown below, was taken by dissolving HMT-PBI in warm DMSO-$d_6$ with a few drops of 40 wt % KOD (in $D_2O$). $^1$H NMR (500 MHz, DMSO-$d_6$, δ 7.62 (m, 2H), 7.37 (m, 2H), 7.23 (s, 4H), 7.07 (m, 2H), 6.96 (m, 2H), 2.08-1.83 (m, 18H).

Synthesis of HMT-PDMBI-I$^-$ (>96% dm HMT-PMBI-I$^-$)

A 250 mL, 3-neck round-bottom flask with septum, condenser, and glass stopper was purged with argon and HMT-PBI (2.00 g, 3.67 mmol), anhydrous dimethyl sulfoxide (128 mL), and lithium hydride (several spatula tips) were added. The mixture was heated to 70° C. for 45 minutes under argon and cooled back to room temperature. Additional lithium hydride (several spatula tips) was added and then mixture was heated again to 70° C. for 45 minutes. The dark brown solution was cooled to room temperature and iodomethane (4.0 mL, 64.3 mmol) was added, resulting in immediate precipitation. The mixture was heated to 70° C. for 30 minutes which re-dissolved the precipitate. Additional iodomethane (6.0 mL, 96.4 mmol) was added and the solution was stirred at 70° C. under argon for 20 hours. The solution was cooled to room temperature and poured into stirring distilled water (1.5 L). Potassium iodide (5.0 g) was added to the mixture, the precipitate was filtered, and washed with water. The solid was dried at 80° C. under vacuum, resulting in 3.02 g of >96% dm HMT-PMBI-I$^-$ (96% yield) as dark red solid. Since this solid still contained a small amount of impurities, a small portion of this red solid was dissolved in hot 0.2 M $KOH_{aq}$, solid impurities were filtered off, and the polymer was precipitated from the filtrate by addition of potassium iodide. This solid was filtered, washed with water, and dried under vacuum at 60° C., resulting in light yellow-coloured product, whose $^1$H NMR was taken, shown below. $^1$H NMR (500 MHz, DMSO-$d_6$, δ 8.74 (m, 2H), 8.37 (m, 4H), 7.45 (m, 6H), 4.03 (s, 6H), 3.98 (s, 6H), 2.16 (m, 12H), 1.86 (s, 6H).

Synthesis of ~50% dm HMT-PMBI-I$^-$

In a 500 mL round-bottom flask with stirbar was added HMT-PBI (10.00 g, 18.36 mmol). A solution containing potassium hydroxide (2.35 g) in 7.2 mL of water was added to the polymer followed by 250 mL of dimethyl sulfoxide. The mixture was heated to 70° C. in air. An additional 50 mL of DMSO was added followed by a solution of potassium hydroxide (1.92 g) dissolved in 5.5 mL of water while at 70° C. After 30 minutes, the mixture was cooled to room temperature and vacuum filtered into a clean round-bottom flask. While vigorously stirring the solution, iodomethane (2.75 mL, 44.17 mmol) was rapidly added and manually stirred for 3 minutes due to the immediate precipitate that formed. The mixture was poured into 3 L of stirring water, the solid was collected, and washed with water and acetone. The solid was moved to 3 L of water containing potassium iodide (20.00 g) and stirred at room temperature for one hour. The solid was collected again and washed with water and acetone. The solid was stirred in 2 L of acetone for 3 days, collected, washed with acetone, and dried under vacuum at 80° C. to yield a fine, brown powder of 52% dm HMT-PMBI-I$^-$ (8.85 g, 84% yield). $^1$H NMR (500 MHz, $CD_2Cl_2$, δ 8.20-8.01 (m, 1.19H), 7.97-7.44 (m, 5.01H), 7.41-7.04 (m, 6.00H), 4.20-3.86 (m, 0.41), 3.85-3.31 (m, 5.92H), 2.29-1.51 (m, 18.42H).

General Synthetic Procedure Used for 66-92% Dm HMT-PMBI-I$^-$

In a round-bottom flask, 52% dm HMT-PMBI-I$^-$ was dissolved in dichloromethane in air (1.5 g of polymer per 25 mL dichloromethane). A small excess of iodomethane was added for the desired degree of methylation and the flask was capped with a glass stopper. The mixture was heated to 30° C. for 16-18 hours. Depending on the degree of methylation, the material was purified differently. For example, the 66% dm polymer was purified by evaporation of the solvent by dynamic vacuum and the resulting film was soaked in acetone, collected, and dried under vacuum at 80° C. to yield a stiff, dark brown film. The 92% dm polymer was purified by precipitation into acetone, filtration, and drying under vacuum at 80° C. to yield light brown fibers. The procedure can also be repeated using a different starting dm %, such as the synthesis of the 89% dm from the 66% dm polymer. The $^1$H NMR spectra of these polymers, at a concentration of 20 mg polymer per 1 mL DMSO-$d_6$, were taken from the DMSO-cast film that had been previously soaked in deionized water overnight to remove DMSO traces and dried under vacuum at 100° C. See FIG. 2 for their $^1$H NMR spectra superimposed along with that of >96% dm HMT-PMBI-I$^-$.

Figure 2:
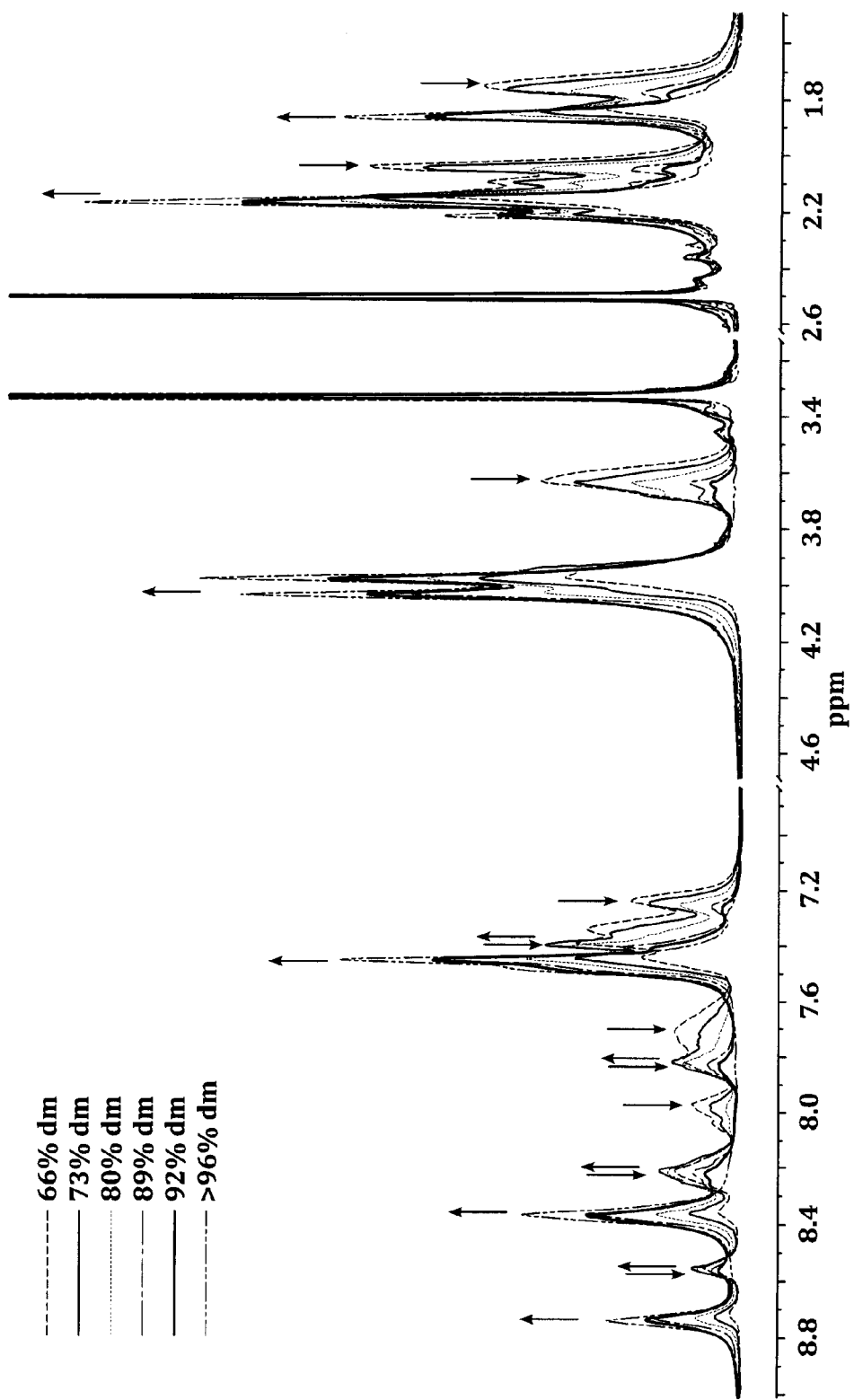
FIG. 2 is an image of superimposed $^1$H NMR spectra (in DMSO-$d_6$) for embodiments of a polymer of the present disclosure, the polymer having 66%, 73%, 80%, 89%, 92%, and >96% degree of methylation (dm). The arrows show the direction of increasing dm %. Mixed arrows show increased peak height followed by decreased peak height as the dm % increases.

FIG. 2 shows the superimposed $^1$H NMR spectra (in DMSO-d$_6$) for 66%, 73%, 80%, 89%, 92%, and >96% dm HMT-PMBI-I$^-$. The arrows show the direction of increasing dm %. Mixed arrows show increased peak height followed by decreased peak height as the dm % increases, likely due to the formation of unit B in the polymer which is then converted into unit C.

Casting Procedure

The polymers were cast by first dissolving 0.20 g of polymer in 12 mL of hot DMSO. The resulting solution was filtered into a clean, flat Petri dish and allowed to dry at 86° C. for 48 hours in air. The resulting transparent, brown films were removed by addition of water, peeling the films off of the glass, and transferring them into deionized water for at least 48 hours before the ion exchange steps. The films were approximately 50 microns thick.

dm Calculation

For this calculation only, the $^1$H NMR spectra were baseline corrected using the "Full Auto (Polynomial Fit)" function found in MestReNova 6.0.4. The degree of methylation was calculated by first setting the integration area between 4.300-3.780 ppm to 12.00 for the $^1$H NMR spectra of HMT-PMBI-I$^-$ in DMSO-d$_6$. This represents the N-methyl groups for the charged benzimidazolium groups. The 3.780-3.500 ppm area was then integrated, whose value is "x", representing the N-methyl peaks of the uncharged benzimidazole groups. Equation S1, shown below, is then used to calculate the dm %:

$$dm\ \% = 50\%\left(\frac{1}{1+\frac{x}{6}}\right) + 50\% \qquad S1$$

IEC Calculation

The ion-exchange capacity in the hydroxide form (IEC) was calculated from the dm % using Equation S2, shown below.

$$IEC\left(\frac{meq.}{g}\right) = \frac{\left(\frac{1000\ meq.}{1\ eq.}\right)\left(\frac{2[2(dm-0.50)]eq.\ OH^-}{1\ repeat\ unit}\right)}{MR_{100}[2(dm-0.50)] + MR_{50}[1 - 2(dm-0.50)]} \qquad S2$$

where dm is the percent fraction of the degree of methylation $$\left(\frac{dm\ \%}{100}\right),$$

MR$_{100}$ is the mass of one repeating unit in 100% dm HMT-PMBI-OH$^-$ $$\left(\frac{636.8244\ g}{repeat\ unit}\right),$$

and MR$_{50}$ is the mass of one repeating unit in 50% dm HMT-PMBI-OH$^-$ $$\left(\frac{572.7406\ g}{repeat\ unit}\right).$$

Ion-Exchange Procedure

The wet iodide-form film was soaked in 300 mL of 1M KOH solution for 48 hours at room temperature in air. The membrane was then transferred into 300 mL of deionized water which was exchanged with fresh deionized water multiple times over at least 5 days before conductivity and water uptake measurements were taken.

Electrochemical Impedance Spectroscopy

Figure 3:
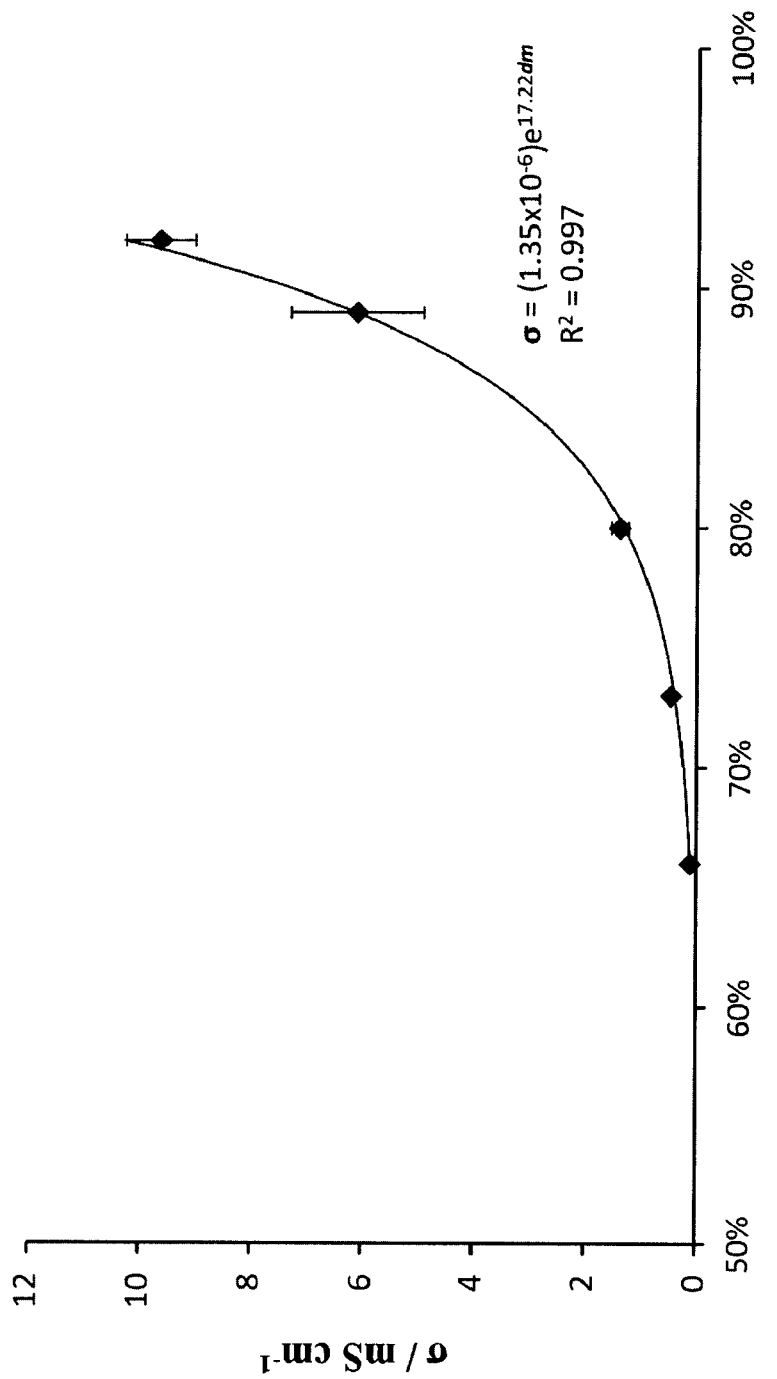
FIG. 3 is a graph showing the ionic conductivity versus the degree of methylation (in percent) for an embodiment of a polymer of the present disclosure, measured at 22° C.

A piece of the wet, hydroxide-converted film was cut into a small piece (approximately 6×10×0.05 mm$^3$) and sandwiched between two PTFE blocks with two platinum electrodes on opposite sides of one of the blocks and a cavity in the center of the blocks (in-plane measurement). The central cavity was filled with enough deionized water to cover the film during the measurement and the ionic resistance (R$_p$) was taken from a best fit of Randles equivalent circuit model, using a Solartron SI 1260 impedance/gain-phase analyzer. The ionic conductivity (σ) was then calculated from Equation S3, as shown below.

$$\sigma(mS\ cm^{-1}) = 10000 * \frac{L}{R_p \cdot T \cdot W} \qquad S3$$

where L is the length, in mm, between the two platinum electrodes (length of cavity), R$_p$ is the resistance, in Ω, calculated from Randles circuit, T is the thickness of the film, in mm, and W is the width of the film between the electrodes, in mm. For each polymer, four measurements of four different pieces were taken (16 measurements per polymer) and the standard deviation was used as the uncertainty. An ionic conductivity plot versus the percent degree of methylation for HMT-PMBI-OH$^-$s measured at 22° C. is shown in FIG. 3.

Water Uptake

The wet hydroxide-exchanged film was placed between two kimwipes to remove surface water and its mass was quickly measured (m$_{wet}$). The film was dried at 100° C. under vacuum for at least 18 hours and its dry mass was quickly measured (m$_{dry}$). The mass water uptake was calculated as shown in Equation S4 below.

$$water\ uptake\ (\%) = \frac{m_{wet} - m_{dry}}{m_{dry}} \qquad S4$$

Four different films were measured for each polymer and the standard deviation was used as the uncertainty.

Degradation Procedure

In a polypropylene tube was added 54.0 mg of 92% dm HMT-PMBI-I$^-$. In a graduated cylinder was added 1.00 g of 40% wt. KOD (in D$_2$O) and then diluted to 3.5 mL with methanol-d$_4$ (2M KOD/CD$_3$OD/D$_2$O solution). This basic mixture was then added to the polymer and capped. The mixture was heated at 60° C. for 159 hours, where samples were periodically taken for $^1$H NMR (500 MHz, CD$_3$OD) analysis. The polymer dissolved within 30 minutes after heating and no precipitate was observed over the 159 hours. A control experiment was also run using the exact same conditions but without the polymer.

Deuterium-Exchange Experiment

In a polypropylene tube was added 92% dm HMT-PMBI-I⁻ (46.1 mg) followed by a 3.5 mL KOD/CD$_3$OD/D$_2$O solution (1.00 g of 40% wt. KOD in D$_2$O which was diluted to 3.5 mL with methanol-d$_4$). After heating the solution for 89 hours at 60° C., the solution was pipetted into a stirring solution of deionized water (100 mL) containing 30.01 g of potassium iodide. The precipitate was collected and washed with H$_2$O. A small amount of D$_2$O was used to wash the solid and approximately one-third of the solid was dissolved in methanol-d$_4$ for $^1$H NMR spectroscopic analysis. The remaining solid was washed with H$_2$O again and transferred into a clean polypropylene tube, followed by an additional 3.5 mL of KOH/CH$_3$OH/H$_2$O solution (1.00 g of 40% wt. KOH in H$_2$O which was diluted to 3.5 mL with methanol). The solution was heated to 60° C. for 90 hours and the solution was then pipetted into a stirring solution of deionized water (100 mL) containing 30.01 g of potassium iodide. The precipitate was collected, washed with H$_2$O and a small amount of D$_2$O, and all of the solid was dissolved in methanol-d$_4$ for $^1$H NMR spectroscopic analysis. No precipitate was observed during the heating.

Variable Temperature $^1$H NMR

Variable temperature $^1$H NMR spectra were recorded with a 500 MHz Bruker AVANCE III spectrometer using a 5 mm TXI probe, BCU-05 chiller, and BVT-3000 temperature control unit calibrated with ethylene glycol. Compound 4, at 50 g/L concentration in DMSO-d$_6$ inside an NMR tube, was placed in a ceramic turbine and $^1$H NMR spectra were recorded at 25, 50, 75, 101, 125, and 148° C., with manual shimming performed at each temperature. The residual DMSO-d$_6$ peak was set to 2.50 ppm.

Results 2,2″,4,4″,6,6″-hexamethyl-p-terphenylene (HMT) was chosen to replace the mesitylene group in mes-PDMBI to increase the hydrophobicity of the backbone and render the polymer water-insoluble, while maintaining steric C2-protection of the cation. HMT also increases the distance between the two adjacent cations, which has been shown to increase the thermal and chemical stability of this class of polymers. This novel ionene, HMT-PDMBI-OH⁻ has an IEC$_{OH-}$ of 3.14 meq g-1, and was synthesized via the novel charge-neutral, C2-protected poly(benzimidazole), HMT-PBI, as shown in FIG. 1.

HMT-PBI is insoluble in DMSO, DMF, and NMP solvents, which are often used to dissolve PBIs, but soluble in basic DMSO (LiH or KOH), which allowed subsequent complete methylation with iodomethane to form HMT-PDMBI-I⁻. However, the fully-methylated polymer, after hydroxide ion-exchange, is water-soluble because of its high IEC$_{OH-}$.

Partial methylation of PBI has been shown to reduce dissolution via a reduction in IEC. However, methylation uses a one-pot reaction in LiH-NMP which requires accurate stoichiometry of reagents (including volatile iodomethane) under an inert environment with heating, rendering methylation difficult to control. In order to control the degree of methylation more reproducibly, a two-step, scalable, air-insensitive methylation procedure was developed wherein the first methylation (requiring DMSO/KOH/H$_2$O) takes only 3 min at room temperature (rt) to yield the neutral polymer, 50% dm HMT-PMBI, as shown in FIG. 1. 50% dm HMT-PMBI is insoluble in DMSO but soluble in chloroform and dichloromethane (DCM). Controlled, partial methylation at the basic nitrogen, performed in DCM using controlled amounts of iodomethane at 30° C. over 16-18 h led to 66%, 73%, 80%, 89%, and 92% degree of methylation (dm). The polymers are soluble in DMSO, thus aiding $^1$H NMR analysis (FIG. 2).

HMT-PMBI consists of four randomly distributed units: A, B, and C, where B represents two structural isomers (see FIG. 1). 50% dm HMT-PMBI is 100 mol % A; whereas 100% dm HMT-PMBI is 100 mol % C. Integration of the N-methyl peaks in the $^1$H NMR spectra provides quantification of dm % (Equation S1). All partially-methylated polymers, including 92% dm, were insoluble in water in both their iodide and hydroxide forms. Cast from DMSO solutions, they formed strong, flexible, transparent brown films. The 89% dm HMT-PMBI derivative was soluble in methanol in the iodide and hydroxide form, insoluble in anhydrous ethanol, but readily soluble in ethanol/water mixtures.

The iodide was exchanged for hydroxide by soaking the films in 1M KOH for 48 h at rt, followed by soaking in deionized water for 120 h with repeated exchanges of water. The deionized water was exposed to air and thus carbonated. While the presence of atmospheric CO$_2$ is known to convert the hydroxide form to a mixed hydroxide, carbonate, and bicarbonate form and that specialized setups are required to characterize the polymer in its hydroxide form, the polymer is labelled HMT-PMBI-OH⁻ for discussion.

The ionic conductivities measured by electrochemical impedance spectroscopy for HMT-PMBI-OH⁻ derivatives are listed in Table 1.

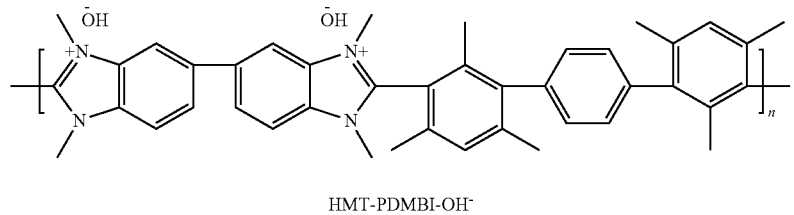

HMT-PDMBI-OH⁻

TABLE 1

Properties of HMT-PMBI-OH⁻ at varying degrees of methylation.

| dm (%)$^a$ | IEC (meq g$^{-1}$)$^b$ | water uptake (wt %) | $\lambda^c$ | $\sigma$ (mS cm$^{-1}$)$^d$ |
|---|---|---|---|---|
| 50 | 0.0 | n/a$^e$ | n/a$^e$ | n/a$^e$ |
| 66 | 1.1 | 29 ± 4 | 15 | 0.10 ± 0.03 |
| 73 | 1.5 | 36 ± 3 | 13 | 0.45 ± 0.06 |
| 80 | 2.0 | 42 ± 3 | 12 | 1.4 ± 0.2 |

TABLE 1-continued

Properties of HMT-PMBI-OH⁻ at varying degrees of methylation.

| dm (%)[a] | IEC (meq g$^{-1}$)[b] | water uptake (wt %) | λ[c] | σ (mS cm$^{-1}$)[d] |
|---|---|---|---|---|
| 89 | 2.5 | 80 ± 20 | 18 | 6.1 ± 1.2 |
| 92 | 2.7 | 180 ± 50 | 37 | 9.7 ± 0.6 |
| 100 | 3.1 | n/a[f] | n/a[f] | n/a[f] |

[a]Degree of methylation as determined by 1H NMR spectroscopy.
[b]Hydroxide ion-exchange capacity as calculated from 1H NMR spectroscopy.
[c]H$_2$O/OH— mole ratio.
[d]Ionic conductivity at 22° C. when fully hydrated.
[e]Could not be cast from DMSO due to its insolubility.
[f]Water-soluble material.

The conductivity exponentially increased with increasing dm %, from 0.10±0.03 mS cm$^{-1}$ for 66% dm to 9.7±0.6 mS cm$^{-1}$ for 92% dm. These are likely to be much higher in the absence of $CO_2$. For example, it has previously been found that the majority of hydroxide is converted to bicarbonate in air and that the bicarbonate diffusion coefficient of the mobile ion approached that of the dilute solution limit at hydration numbers (λ) above 20. With dilute solutions, the diffusion coefficients of hydroxide and bicarbonate are 5.3× 10$^{-5}$ and 1.2×10$^{-5}$ cm$^2$ s$^{-1}$, respectively. Assuming that the 92% dm HMT-PMBI-OH⁻ was in bicarbonate form, the hydroxide conductivity would be 4.4 times larger, i.e., 43 mS cm$^{-1}$, which is of the same order of magnitude as for other imidazolium- and benzimidazolium-based polymers.

Figure 4:
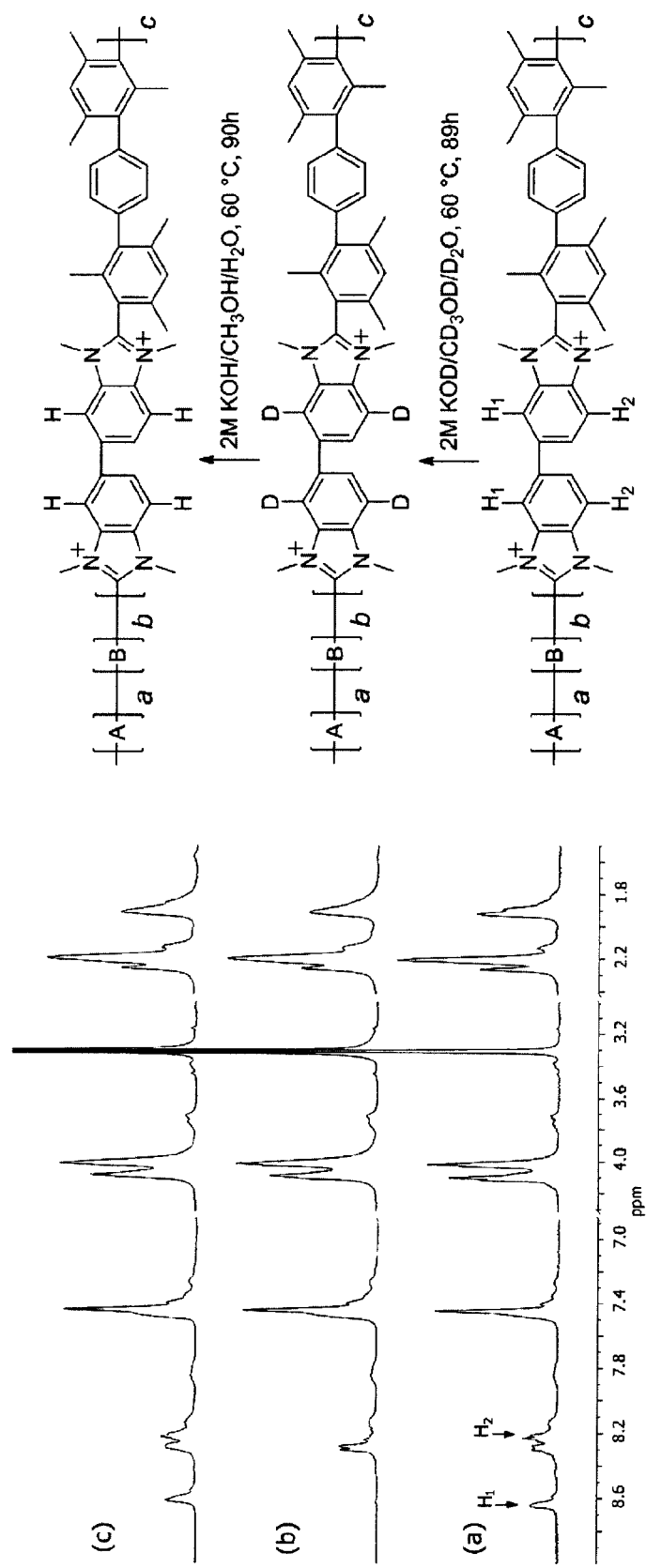
FIG. 4 is an image of stacked $^1$H NMR spectra regions and corresponding chemical structures of an embodiment of a polymer of the present disclosure, having 92% degree of methylation. Spectrum (a) corresponds to the polymer in its initial cast, iodide form, spectrum (b) corresponds to the polymer after 89 hours in 2M KOD/CD$_3$OD/D$_2$O at 60° C. to exchange the polymer to the deuterium form, and spectrum (c) corresponds to the polymer after 90 hours of the deuterium-exchanged polymer being subjected to 2M KOH/CH$_3$OH/H$_2$O at 60° C. conditions to return the polymer to its original hydrogen-based form. The anions are not shown for clarity.

The hydroxide stability of 92% dm HMT-PMBI dissolved in 2M KOD/CD$_3$OD/D$_2$O at 60° C. over 7 days was monitored; these conditions are known to strongly accelerate degradation. The stability test was carried out in polypropylene tubes as silica glass leads to the formation of precipitates in strongly basic conditions. Samples were extracted periodically and analyzed by $^1$H NMR spectroscopy. The chemical shifts of the peaks associated with the polymer were unchanged over the 7 days. However, several of the aromatic peaks slowly vanished after 63 h, suggestive of deuterium exchange, as opposed to degradation. This was proved by carrying out the same experiment for 4 days in KOD/CD$_3$OD/D$_2$O followed by 4 days in KOH/CH$_3$OH/H$_2$O. The spectra of 92% dm HMT-PMBI (FIG. 4) show the disappearance of two aromatic peaks due to deuterium-exchange and full recovery after hydrogen-exchange.

Several new peaks appeared in all of the degradation test spectra and continued to grow over time at 1.27 ppm (broad singlet), 1.23 ppm (sharp singlet), and 0.83 ppm (multiplet). These peaks were found to arise from the polypropylene tube, as observed in a control experiment.

Since no new NMR peaks were formed from 92% dm HMT-PMBI over 7 days, it can be assumed that steric C2-protection of the cationic group has been successful at negating ring-opening degradation. As the 92% dm HMT-PMBI-OH⁻ is not fully methylated, the uncharged N-methyl groups were used as an internal standard for $^1$H NMR integration relative to the cationic N-methyl groups. Integration of these peaks indicates the dm % varies by <1% over the 7 day degradation experiment and 8 day deuterium-exchange experiment, thus providing evidence that there is also negligible nucleophilic displacement occurring, which showcases the remarkable hydroxide-stability of this polymer.

Figure 5:
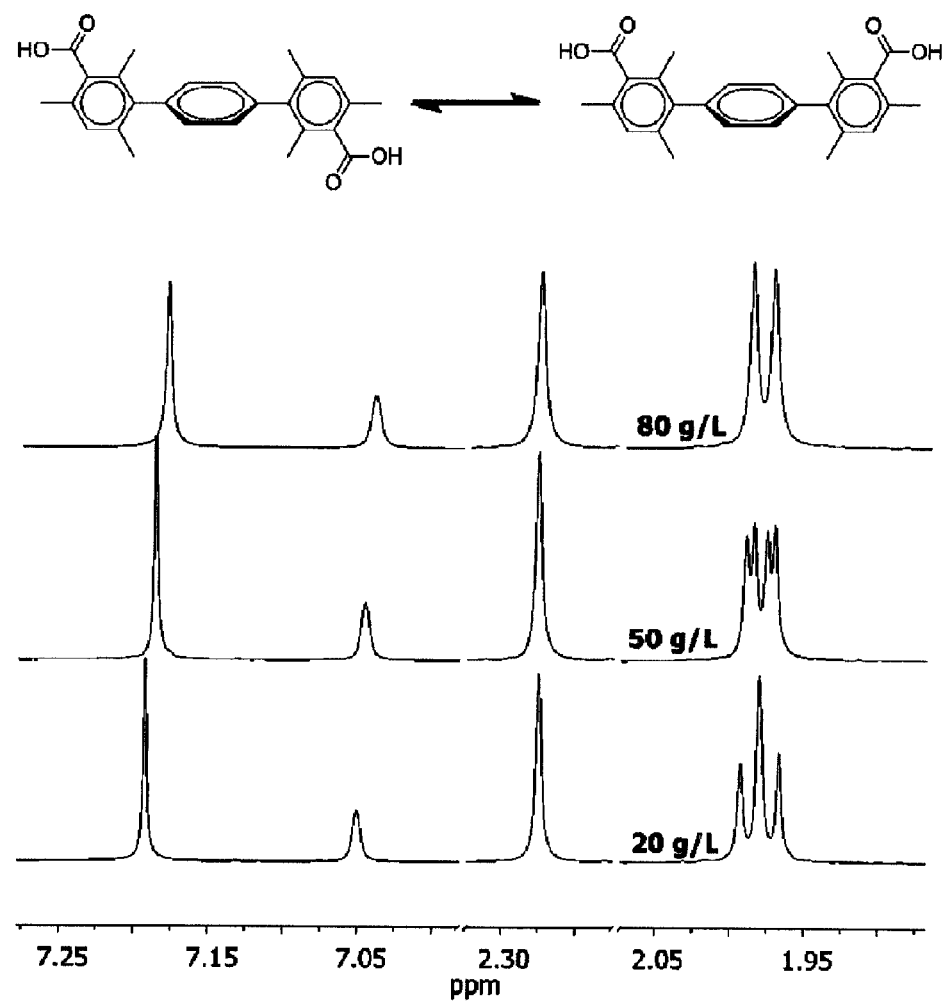
FIG. 5 is an image of the $^1$H NMR spectra (500 MHz in DMSO-$d_6$) showing racemization of a compound of the present disclosure in solution at 20, 50, and 80 g/L concentrations.

An interesting aspect of the HMT group is the atropisomerization it exhibits in solution at room temperature, as shown in FIG. 5. FIG. 5 shows the racemization of compound 4 in solution as observed by the $^1$H NMR (500 MHz) spectra in DMSO-d$_6$ at 20 g/L (bottom), 50 g/L (middle), and 80 (top) g/L concentrations. With a concentration of 50 mg of 4 per 1.0 mL of DMSO-d$_6$ (50 g/L), the NMR peaks at 1.98 ppm appear as a quartet but in fact are two overlapping sets of two singlets derived from the inner 2, 2", 6, and 6" methyl groups that result from hindered rotation around the central phenyl ring. The chemical shifts are further influenced by concentration, which suggests aggregation in solution. This effect is also observed in solutions of 4 (50 g/L) using variable-temperature $^1$H NMR spectroscopy between 25° C. and 148° C. At 25° C., isomerization is slower than the 500 MHz $^1$H NMR time-scale, but is sufficiently fast at 50° C. that the apparent quartet simplifies to two peaks. Upon increasing the temperature further, the two peaks coalesce at 101° C., then move apart at 148° C. This is explained by the average angle of preference around the central phenyl ring.

In summary, novel alkaline anion exchange ionenes were synthesized which showed exceptionally high stability under strongly basic conditions (that rapidly degrade other polymers) and were soluble in alcohol-based solvents; these properties give them potential application in fuel cells and water electrolyzers. These materials have also been shown to contain an atropisomeric unit.

Example 2

Large Scale Synthesis of HMT-PMBI

Figure 6:
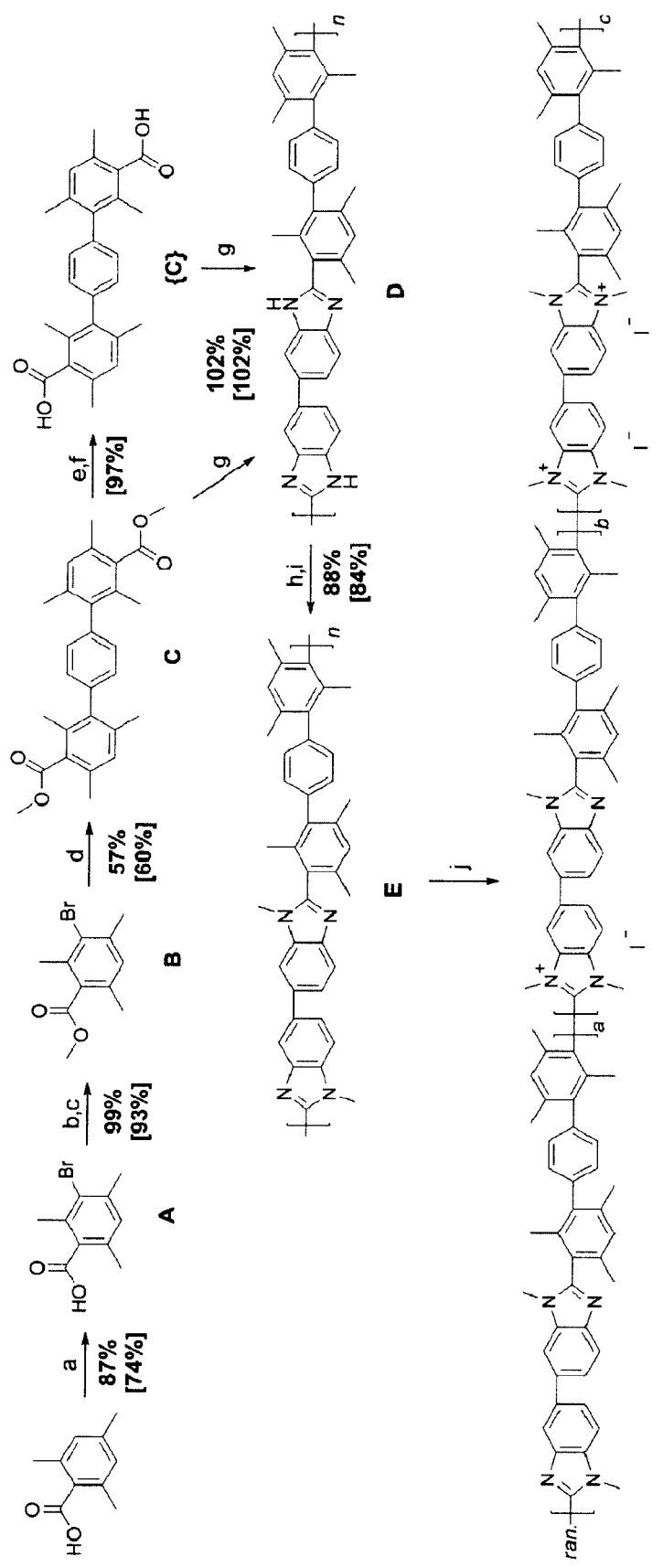
FIG. 6 is a schematic illustration of a procedure for synthesizing an embodiment of a polymer of the present disclosure.

An alternative synthetic procedure to that described in Example 1 is shown in FIG. 6. Referring to FIG. 6, the reagents and conditions for each of steps (a)-(j) are as follows: (a) bromine, AcOH, 2 h, rt; (b) KOH, DMSO, rt, 15 min; (c) MeI, 2 h, rt; (d) 1,4-phenylenediboronic acid, 2 M K$_2$CO$_3$, 1,4-dioxane, Pd(PPh$_3$)$_4$, reflux, 22 h; (e) H$_2$SO$_4$, 30 min, rt; (f) H$_2$O, 15 min; (g) 3,3'-diaminobenzidine, Eaton's reagent, 120-140° C., 1.5 h; (h) KOH, DMSO, 70° C., 30 min; (i) MeI, rt, 3 min; (j) MeI, DCM, 30° C., 16-18 h.

Referring again to FIG. 6, polymer D can be formed directly from compound C rather than from {C}, which saves one step overall from the synthetic procedure. The process was repeated on much larger scales to produce 730 g of D (1.34 mole scale). The yields were better in almost every case, showing not only the reproducibility of the synthesis but also for its potential to scale-up even further. The synthesis from the starting material to the final polymer has an overall yield of 44%, as step j has a quantitative yield.

The final polymer F (HMT-PMBI) is soluble in alcohol mixtures and polar aprotic solvents. Without intending to be bound by theory, it is believed that the most useful solvents for engineering purposes are methanol, isopropanol, and dimethylsulfoxide. Membranes can be cast from these solvents and can be used in many different applications. The solubility in alcohols is important for making this polymer unique, as it allows the material to be used in spray-coated applications, such as ionomer in catalyst layers.

Additionally, the methylation degree allows the manufacture of membranes/ionomers that are water-insoluble. Advantageously, the polymers do not need to be blended to form membranes or ionomers. Without intending to be bound by theory, it is believed that blending complicates the resulting material properties and would not take advantage of the alcohol-solubility of polymer F, because the acidic polymers used to blend with are alcohol-insoluble (a common solvent would have to be used for a blend).

While illustrative embodiments have been illustrated and described, it will be appreciated that various changes can be made therein without departing from the spirit and scope of the invention.

The embodiments of the invention in which an exclusive property or privilege is claimed are defined as follows:

1. A polymer comprising one or more repeating units, wherein at least one of the repeating units comprises one or more benzimidazolium-containing moieties of Formulas (I)-(V):

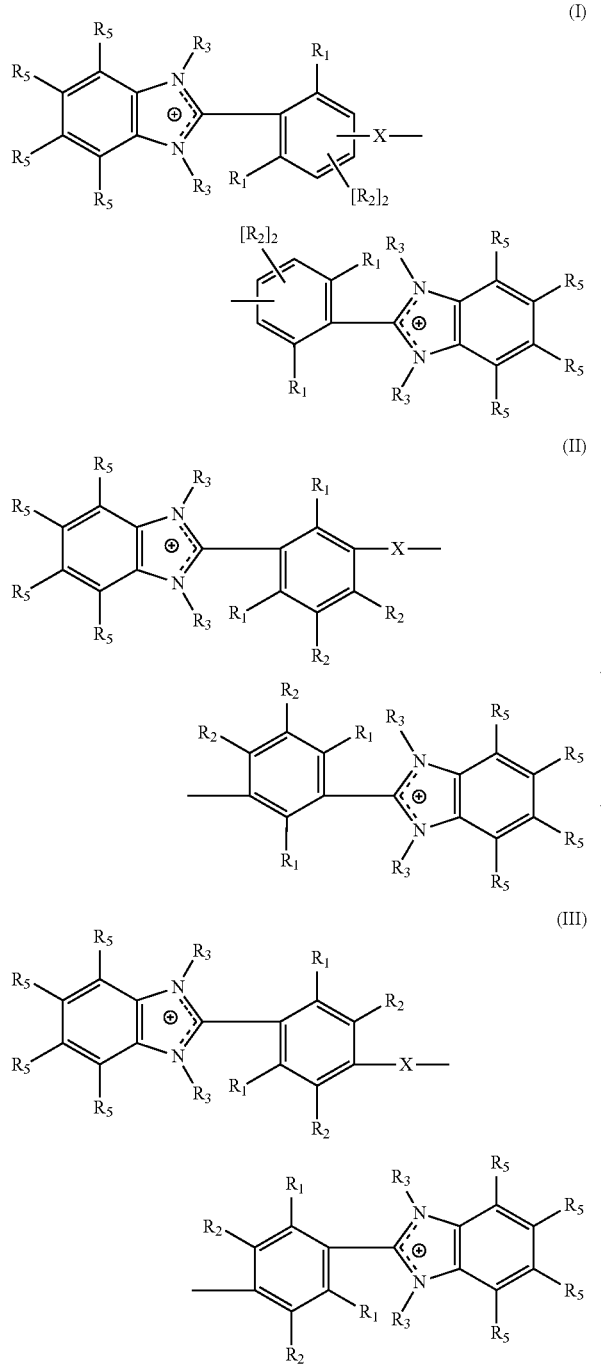

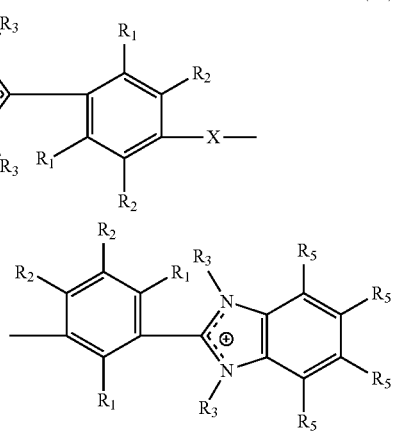

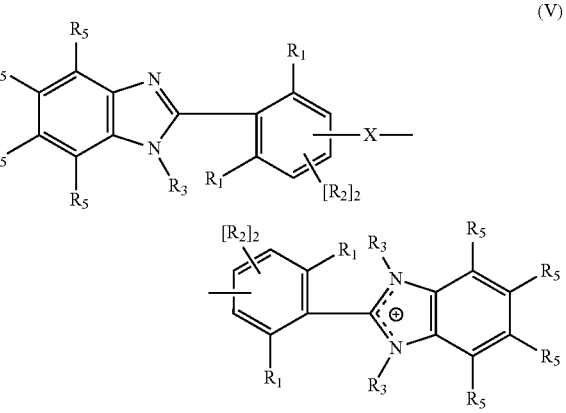

wherein:

$R_1$ is independently selected from the group consisting of alkyl, perfluoroalkyl, heteroalkyl, alkoxy, perfluoroalkoxy, halo, aryl, heteroaryl group and a polymer;

$R_2$ is independently selected from the group consisting of hydrogen, alkyl, and a polymer;

$R_3$ is independently selected from the group consisting of alkyl, perfluoroalkyl, heteroalkyl, aryl, aralkyl, and a polymer;

$R_5$ is independently selected from the group consisting of hydrogen, alkyl, and a polymer;

wherein at least one of $R_1$, $R_2$, $R_3$, and $R_5$, is a polymer; and

X is independently selected from the group consisting of alkylene, perfluoroalkylene, heteroalkylene, arylene, aralkylene, and no group.

2. The polymer of claim 1, wherein the polymer is a salt formed with an anion selected from the group consisting of iodide, triiodide, hydroxide, chloride, bromide, fluoride, cyanide, acetate, carbonate, nitrate, sulfate, phosphate, triflate, and tosylate.

3. The polymer of claim 1, wherein the benzimidazolium-containing moiety is included in a main chain of the polymer, in a pendant chain of the polymer, or is part of a crosslink of the polymer.

4. The polymer of claim 1, further comprising a second repeating unit defined by Formula (VI):

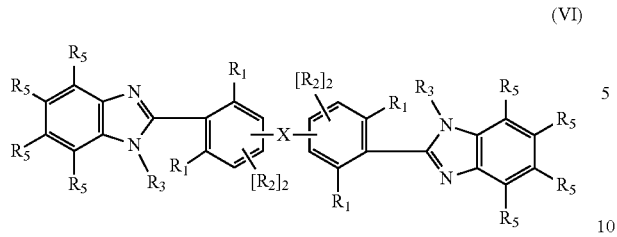

(VI)

wherein:
R₁ is independently selected from the group consisting of alkyl, perfluoroalkyl, heteroalkyl, alkoxy, perfluoroalkoxy, halo, aryl, heteroaryl group and a polymer;
R₂ is independently selected from the group consisting of hydrogen, alkyl, and a polymer;
R₃ is independently selected from the group consisting of alkyl, perfluoroalkyl, heteroalkyl, aryl, aralkyl, and a polymer;
R₅ is independently selected from the group consisting of hydrogen, alkyl, and a polymer;
wherein at least one of R₁, R₂, R₃, and R₅, is a polymer; and
X is independently selected from the group consisting of alkylene, perfluoroalkylene, heteroalkylene, arylene, aralkylene, and no group.

5. The polymer of claim 4, wherein the polymer is a random copolymer of Formulas (I), (V), and (VI).

6. The polymer of claim 1, wherein R₁ is methyl.

7. The polymer of claim 1, wherein R₂ is independently selected from the group consisting of hydrogen and methyl.

8. The polymer of claim 1, wherein R₃ is methyl.

9. The polymer of claim 1, wherein R₅ is independently selected from the group consisting of hydrogen and a polymer.

10. The polymer of claim 1, wherein X is 1,4-phenylene.

11. A polymer of Formula (VIII):

wherein:
$R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$R_{13a}$, $R_{13b}$, $R_{14a}$, and $R_{14b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that two of $R_{13a}$, $R_{13b}$, $R_{14a}$, and $R_{14b}$ are absent, and the remaining two are present and independently selected from $C_{1-6}$ alkyl, $C_{1-6}$ haloalkyl, $C_{1-6}$ alkoxy, $C_{1-6}$ haloalkoxy, halo, aryl, and heteroaryl, $R_{23a}$, $R_{23b}$, $R_{24a}$, and $R_{24b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that one of $R_{23a}$, $R_{23b}$, $R_{24a}$ and $R_{24b}$ is absent, the remaining three are present and independently selected from $C_{1-6}$ alkyl, $C_{1-6}$ haloalkyl, $C_{1-6}$ alkoxy, $C_{1-6}$ haloalkoxy, halo, aryl, and heteroaryl, and the ring having the absent $R_{23a}$, $R_{23b}$, $R_{24a}$, or $R_{24b}$ is uncharged;

$R_{33a}$, $R_{33b}$, $R_{34a}$, and $R_{34b}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$X_{11}$, $X_{21}$, and $X_{31}$ are each independently selected from the group consisting of absent, $C_{1-6}$ alkylene, $C_{1-6}$ haloalkylene, arylene, and heteroarylene; and a, b, and c are mole percentages, wherein

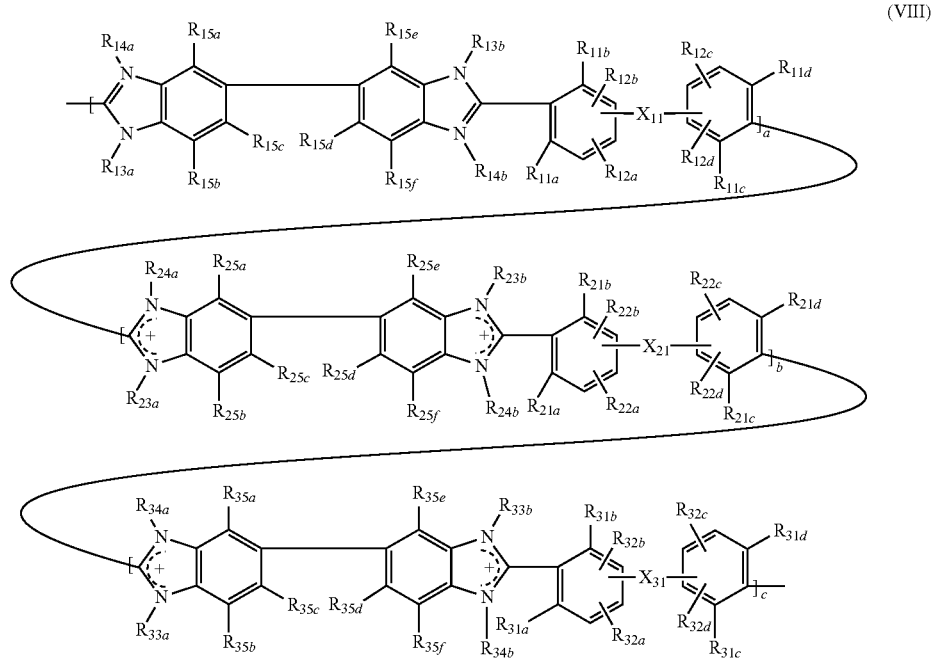

(VIII)

a is from 0 mole percent to 45 mole percent,
b+c is 55 mole percent to 100 mole percent,
b and c are each more than 0 percent, and
a+b+c=100%.

12. The polymer of claim 11, having Formula (VIIIa)

$X_{11}$, $X_{21}$, and $X_{31}$ are each independently selected from the group consisting of absent, $C_{1-6}$ alkylene, $C_{1-6}$ haloalkylene, arylene, and heteroarylene; and a, b, and c are mole percentages, wherein
a is from 0 mole percent to 45 mole percent,

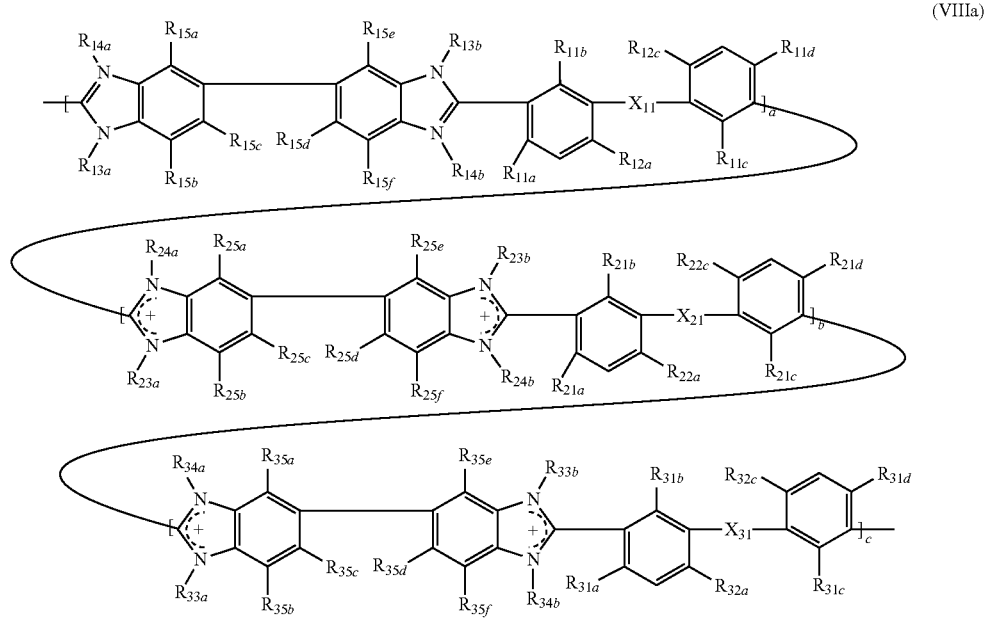

(VIIIa)

wherein:

$R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{12a}$, $R_{12c}$, $R_{22a}$, $R_{22c}$, $R_{32a}$, and $R_{32c}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

$R_{13a}$, $R_{13b}$, $R_{14a}$, and $R_{14b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that two of $R_{13a}$, $R_{13b}$, $R_{14a}$, and $R_{14b}$ are absent, and the remaining two are present and independently selected from $C_{1-6}$ alkyl, $C_{1-6}$ haloalkyl, $C_{1-6}$ alkoxy, $C_{1-6}$ haloalkoxy, halo, aryl, and heteroaryl, $R_{23a}$, $R_{23b}$, $R_{24a}$, and $R_{24b}$ are each independently selected from absent, $C_{1-6}$ alkyl, $C_{1-6}$ haloalkyl, $C_{1-6}$ alkoxy, $C_{1-6}$ haloalkoxy, halo, aryl, and heteroaryl, provided that one of $R_{23a}$, $R_{23b}$, $R_{24a}$ and $R_{24b}$ is absent, and the remaining three are present and independently selected from $C_{1-6}$ alkyl, $C_{1-6}$ haloalkyl, $C_{1-6}$ alkoxy, $C_{1-6}$ haloalkoxy, halo, aryl, and heteroaryl, and the ring having the absent $R_{23a}$, $R_{23b}$, $R_{24a}$, or $R_{24b}$ is uncharged;

$R_{33a}$, $R_{33b}$, $R_{34a}$, and $R_{34b}$ are each independently selected from $C_{1-6}$ alkyl, $C_{1-6}$ haloalkyl, $C_{1-6}$ alkoxy, $C_{1-6}$ haloalkoxy, halo, aryl, and heteroaryl;

$R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H, $C_{1-6}$ alkyl, $C_{1-6}$ haloalkyl, $C_{1-6}$ alkoxy, $C_{1-6}$ haloalkoxy, halo, aryl, and heteroaryl;

b+c is 55 mole percent to 100 mole percent,
b and c are each more than 0 percent, and
a+b+c=100%.

13. The polymer according to claim 11, wherein $R_{11a}$, $R_{11b}$, $R_{11c}$, $R_{11d}$, $R_{21a}$, $R_{21b}$, $R_{21c}$, $R_{21d}$, $R_{31a}$, $R_{31b}$, $R_{31c}$, and $R_{31d}$ are each independently selected from methyl and ethyl.

14. The polymer according to claim 11, wherein $R_{12a}$, $R_{12b}$, $R_{12c}$, $R_{12d}$, $R_{22a}$, $R_{22b}$, $R_{22c}$, $R_{22d}$, $R_{32a}$, $R_{32b}$, $R_{32c}$, and $R_{32d}$, when present, are each independently selected from H and methyl.

15. The polymer according to claim 11, wherein $R_{13a}$, $R_{13b}$, $R_{14a}$, and $R_{14b}$ are each independently selected from absent and methyl, provided that two of $R_{13a}$, $R_{13b}$, $R_{14a}$, and $R_{14b}$ are absent, and the remaining two are present and are methyl.

16. The polymer according to claim 11, wherein $R_{23a}$, $R_{23b}$, $R_{24a}$, and $R_{24b}$ are each independently selected from absent and methyl, provided that one of $R_{23a}$, $R_{23b}$, $R_{24a}$, and $R_{24b}$ is absent, and the remaining three are present and are methyl, and the ring having the absent $R_{23a}$, $R_{23b}$, $R_{24a}$, or $R_{24b}$ is uncharged.

17. The polymer according to claim 11, wherein $R_{33a}$, $R_{33b}$, $R_{34a}$, and $R_{34b}$ are each independently methyl.

18. The polymer according to claim 11, wherein $R_{15a}$, $R_{15b}$, $R_{15c}$, $R_{15d}$, $R_{15e}$, $R_{15f}$, $R_{25a}$, $R_{25b}$, $R_{25c}$, $R_{25d}$, $R_{25e}$, $R_{25f}$, $R_{35a}$, $R_{35b}$, $R_{35c}$, $R_{35d}$, $R_{35e}$, and $R_{35f}$ are each independently selected from H and $C_{1-6}$ alkyl.

19. The polymer according to claim 11, wherein $X_{11}$, $X_{21}$, and $X_{31}$ are each 1,4-phenylene.

20. The polymer of claim 11, wherein the polymer is a salt formed with an anion selected from the group consisting of iodide, triiodide, hydroxide, chloride, bromide, fluoride, cyanide, acetate, carbonate, nitrate, sulfate, phosphate, triflate, and tosylate.

21. The polymer according to claim 11, wherein the polymer is a random copolymer.

22. An ionic membrane comprising a cationic polymer of claim 1.

23. An ionomer comprising a cationic polymer of claim 1, wherein the ionomer is incorporated into a catalyst layer of a fuel cell.

24. A method of post-functionalizing a polymer containing a benzimidazole moiety in a repeating unit to provide a neutral polymer containing a repeat unit of Formula (VI),

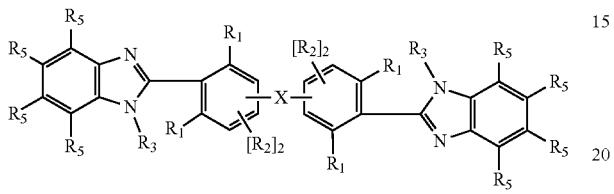

(VI)

wherein:
- $R_1$ is independently selected from the group consisting of alkyl, perfluoroalkyl, heteroalkyl, alkoxy, perfluoroalkoxy, halo, aryl, heteroaryl group and a polymer;
- $R_2$ is independently selected from the group consisting of hydrogen, alkyl, and a polymer;
- $R_3$ is independently selected from the group consisting of alkyl, perfluoroalkyl, heteroalkyl, aryl, aralkyl, and a polymer;
- $R_5$ is independently selected from the group consisting of hydrogen, alkyl, and a polymer;
- wherein at least one of $R_1$, $R_2$, $R_3$, and $R_5$, is a polymer; and
- X is independently selected from the group consisting of alkylene, perfluoroalkylene, heteroalkylene, arylene, aralkylene, and no group;

the method comprising the steps of:
(a) Deprotonating the polymer containing the benzimidazole moiety with an alkali hydroxide by heating in a polar aprotic solvent and optionally an amount of water to provide a deprotonated benzimidazole-containing polymer;
(b) Optionally filtering and washing the deprotonated benzimidazole-containing polymer;
(c) Adding excess $R_3$—Y to the polymer solution and stirring to provide a neutral polymer containing a repeat unit of Formula VI, wherein Y represents an anionic leaving group comprising iodide, bromide, chloride, or sulfonate ester.

25. A method of post-functionalizing a neutral polymer containing a repeat unit of Formula (VI),

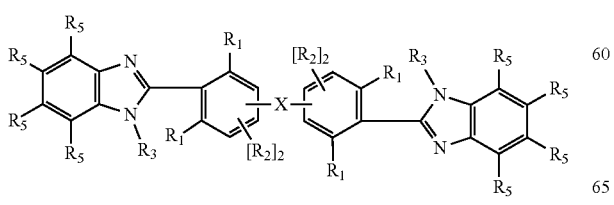

(VI)

wherein:
- $R_1$ is independently selected from the group consisting of alkyl, perfluoroalkyl, heteroalkyl, alkoxy, perfluoroalkoxy, halo, aryl, heteroaryl group and a polymer;
- $R_2$ is independently selected from the group consisting of hydrogen, alkyl, and a polymer;
- $R_3$ is independently selected from the group consisting of alkyl, perfluoroalkyl, heteroalkyl, aryl, aralkyl, and a polymer;
- $R_5$ is independently selected from the group consisting of hydrogen, alkyl, and a polymer;
- wherein at least one of $R_1$, $R_2$, $R_3$, and $R_5$, is a polymer; and
- X is independently selected from the group consisting of alkylene, perfluoroalkylene, heteroalkylene, arylene, aralkylene, and no group;

to provide a cationic polymer containing a benzimidazole-containing moiety of Formulas (I), (V), and (VI),

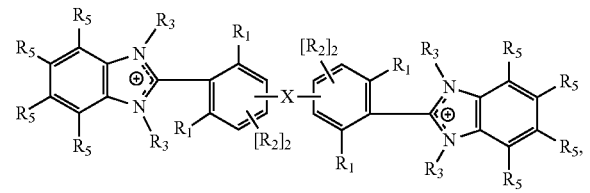

(I)

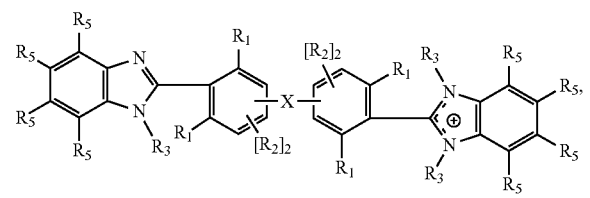

(V)

and

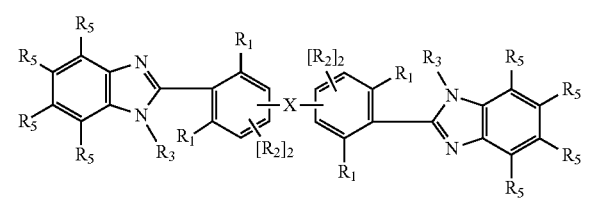

(VI)

wherein:
- $R_1$ is independently selected from the group consisting of alkyl, perfluoroalkyl, heteroalkyl, alkoxy, perfluoroalkoxy, halo, aryl, heteroaryl group and a polymer;
- $R_2$ is independently selected from the group consisting of hydrogen, alkyl, and a polymer;
- $R_3$ is independently selected from the group consisting of alkyl, perfluoroalkyl, heteroalkyl, aryl, aralkyl, and a polymer;
- $R_5$ is independently selected from the group consisting of hydrogen, alkyl, and a polymer;
- wherein at least one of $R_1$, $R_2$, $R_3$, and $R_5$, is a polymer; and
- X is independently selected from the group consisting of alkylene, perfluoroalkylene, heteroalkylene, arylene, aralkylene, and no group;

the method comprising the steps of:
- (a) Dissolving a neutral polymer containing a repeat unit of Formula VI in an organic solvent to provide a polymer solution;
- (b) Adding a known amount of $R_3$—Y to the polymer solution and stirring the polymer solution for a period of time to provide a cationic polymer containing Formulas (I), (V), and (VI), wherein Y represents an anionic leaving group comprising iodide, bromide, chloride, or sulfonate ester.

* * * * *